United States Patent [19]
Rogowitz et al.

[11] Patent Number: 5,874,955
[45] Date of Patent: Feb. 23, 1999

[54] INTERACTIVE RULE BASED SYSTEM WITH SELECTION FEEDBACK THAT PARAMETERIZES RULES TO CONSTRAIN CHOICES FOR MULTIPLE OPERATIONS

[75] Inventors: Bernice Ellen Rogowitz, Ossining, N.Y.; David Alan Rabenhorst, Woodcliff Lake, N.J.; Lloyd Alan Treinish, Yorktown Heights, N.Y.

[73] Assignee: International Business Machines Corporation, Armonk, N.Y.

[21] Appl. No.: 615,578

[22] Filed: Mar. 12, 1996

Related U.S. Application Data

[63] Continuation of Ser. No. 191,882, Feb. 3, 1994, abandoned.
[51] Int. Cl.$^6$ ........................................... G06F 3/00
[52] U.S. Cl. ..................... 345/339; 364/148.04; 706/60
[58] Field of Search .................... 345/326–358; 364/148.04, 468.1; 706/60

[56] References Cited

U.S. PATENT DOCUMENTS

| | | | |
|---|---|---|---|
| 4,965,741 | 10/1990 | Winchell et al. | 706/11 |
| 5,442,563 | 8/1995 | Lee | 364/468.1 |
| 5,574,828 | 11/1996 | Hayward et al. | 706/45 |
| 5,621,873 | 4/1997 | Tanaka et al. | 707/517 |

FOREIGN PATENT DOCUMENTS

| | | | |
|---|---|---|---|
| 0242471 | 4/1986 | European Pat. Off. | G06F 9/44 |
| 0405876 | 1/1991 | European Pat. Off. | G06F 9/44 |
| 0439343 | 7/1991 | European Pat. Off. | G06F 9/44 |
| 63-138430 | 11/1986 | Japan . | |
| 63-184861 | 1/1987 | Japan . | |
| 2263236 | 3/1989 | Japan . | |
| 3157751 | 11/1989 | Japan . | |
| 4213113 | 12/1990 | Japan . | |
| 528134 | 7/1991 | Japan . | |
| 5100730 | 10/1991 | Japan . | |
| 5210473 | 12/1991 | Japan . | |

OTHER PUBLICATIONS

S. E. Hudson et al, Smoothly Integrating Rule–Based Techniques Into A Direct Manipulation Interface Builder, UIST'91, pp. 145–153.

Scott E. Hudson and Andrey K. Yeatts, Smoothly Integrating Rule–Based Techniques Into A direct Manipulation, UIST'91, Nov. 11–13, 1991, pp. 145–153.

*Primary Examiner*—A. Katbab
*Attorney, Agent, or Firm*—Louis J. Percello

[57] ABSTRACT

A rule based system and method interacts with a user to provide the user a series of interim results. The system has a set of one or more operations. Each of these operations in turn has a set of one or more choices, called a choice set, associated with an operation. Rule based intelligence is applied to the operations set and/or one or more operation choice set by a set of rules associated with its respective operation and/or choice set. When one or more rules in a rule set are applied to the operation set, an offered operation set is created which is a subset of the operation set. Only the operations in the offered operation set are offered to the user. When one or more rules in a rule set are applied to a choice set, an offered choice set is created which is a subset of the choice set. Only those operation choices in the offered choice set are offered to the user. The operations (operation choices) that are in the offered operation set (offered choice set) are those that conform to the constraints of the rules that are applied. The user selects operations (operation choices) from the offered operation set (offered choice set). Information about the user selections feeds back to the rules and is used to constrain the next offered operations and operation choices. The user is also permitted to change rules, rule specific metadata, and rule specific metadata algorithms as well as the data in the system. Interacting with the system this way, the user preference, knowledge, and judgment is incorporated in each of a series of interim results and is used to further develop the next interim result in the series of iterations.

23 Claims, 15 Drawing Sheets

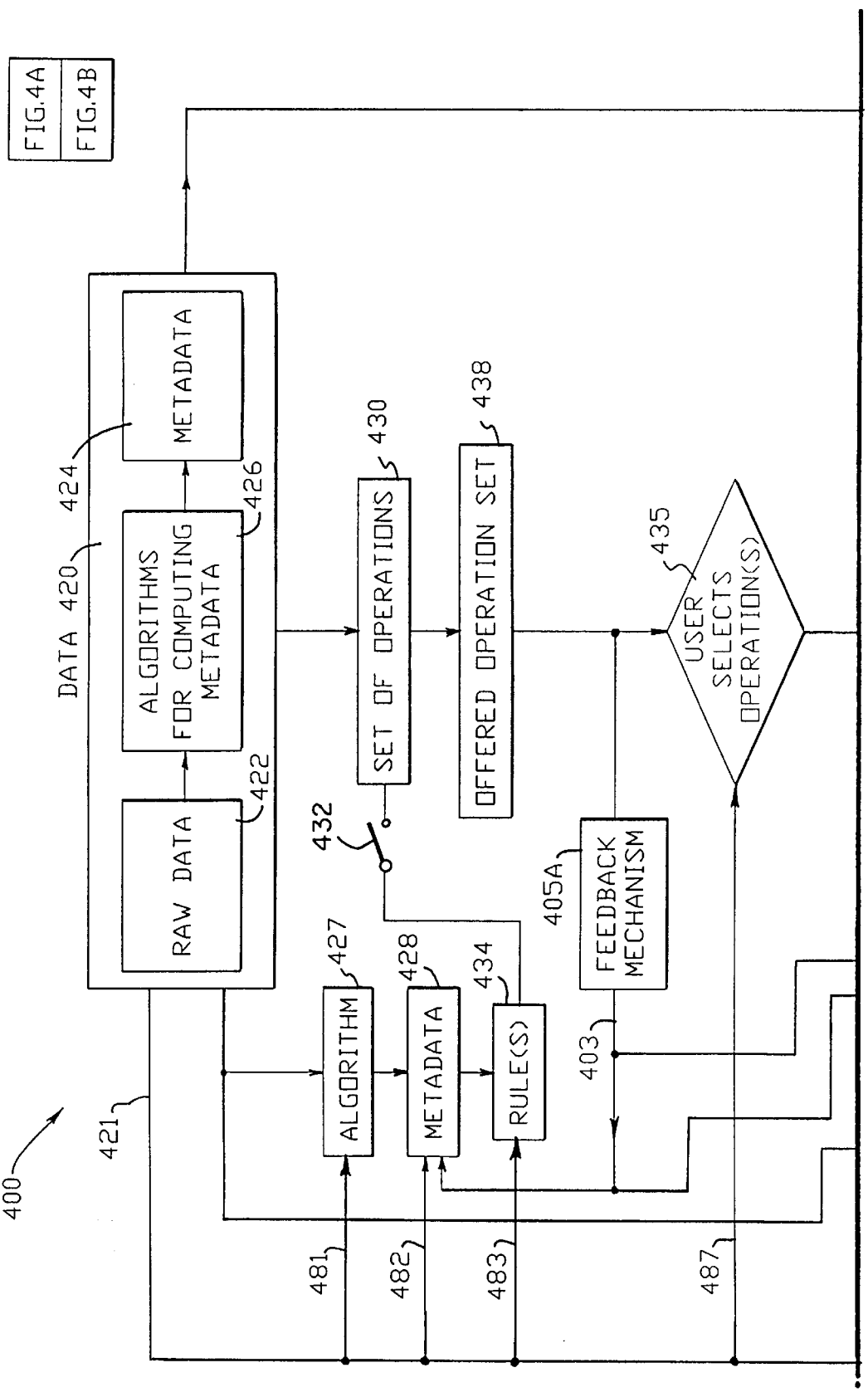

FIG. 5

| RELEVANT DATA 510 | METADATA COMPUTED FROM ALGORITHM 520 | METADATA ABOUT USER SELECTIONS 530 | USER PROVIDED METADATA 540 |
|---|---|---|---|
| $d_1$: e.g., WHETHER DATA ARE CORRECTED FOR ATMOSPHERIC PRESSURE | $a_1$: e.g., SPATIAL FREQUENCY MEASURE | $s_1$: e.g., BACKGROUND COLOR LUMINANCE | $u_1$: e.g., VISUALIZATION TASK TYPE |
| $d_2$: | $a_2$: e.g., FONT WIDTH MEASURE | $s_2$: | $u_2$: e.g., DOMAIN INFORMATION |
| . . . | $a_3$: | $s_3$: | $u_3$: |
| $d_n$: | . . . | . . . | . . . |
|  | $a_n$: | $s_n$: | $u_n$: |

500

FIG. 13
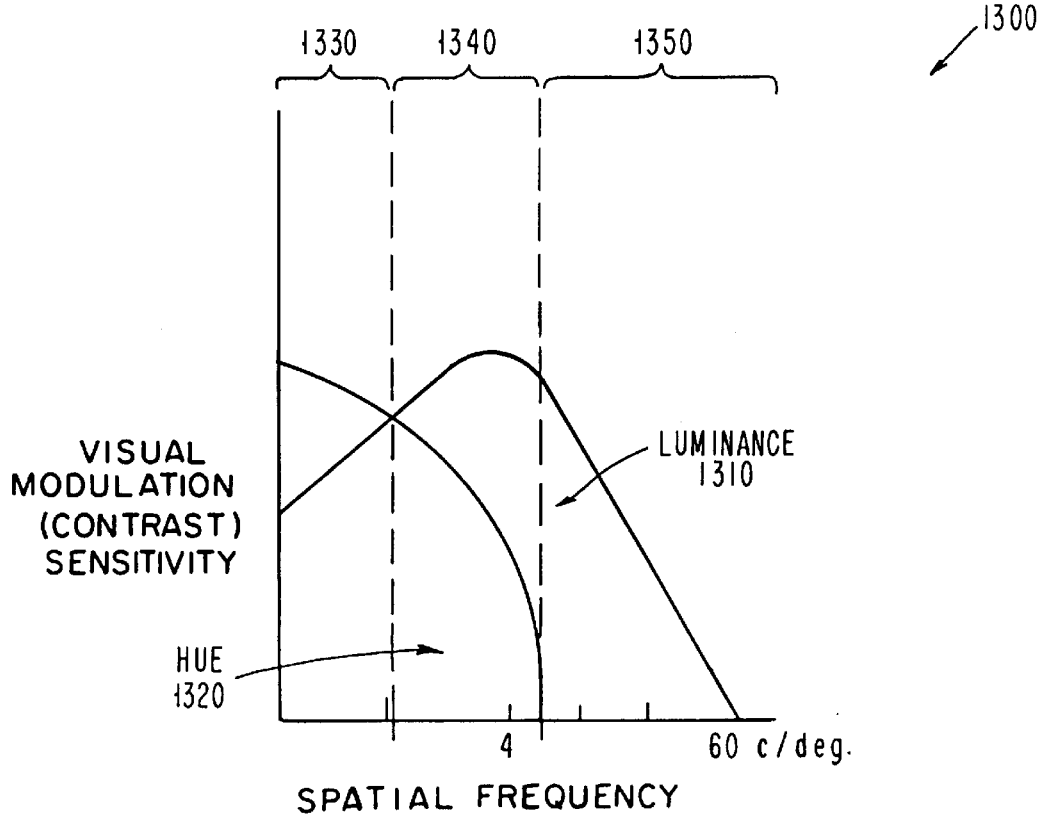
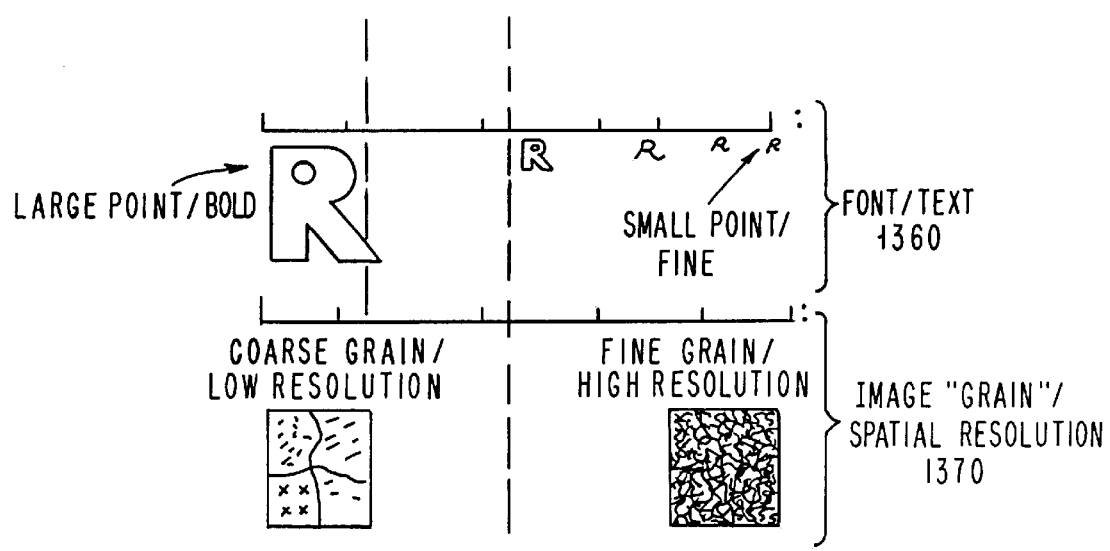

INTERACTIVE RULE BASED SYSTEM WITH SELECTION FEEDBACK THAT PARAMETERIZES RULES TO CONSTRAIN CHOICES FOR MULTIPLE OPERATIONS

This patent is a continuation of U.S. patent application Ser. No. 08/191,882, filed Feb. 3, 1994, which is now abandoned.

FIELD OF THE INVENTION

This invention relates to the field of rule based computer systems. More specifically, the invention relates to a computer system that interactively offers a user a set of choices that have been constrained by rules.

BACKGROUND OF THE INVENTION

A typical prior art rule based, e.g. an "expert system," is shown in FIG. 1. A rule based system 100 has a storage location for data 120. Data is typically raw data 122 that is normally provided by the user 110 of the system 100. Some rule based systems also have metadata 124 which is data about the raw data 122. The metadata 124 is determined from the raw data 122 by using a raw data algorithm 126.

Rules 130 and rule based operations 135 are programmed into the system 100 by a system designer. Ordinarily, the rules 130 and operations 135 are intermingled 134 and inaccessible 134 to the user 110. The system designer pre-defines and pre-installs the rules 130 and rule based operations 135 in the system 100 without input from the user 110. The system designer can also design the rules 130 to contain parameters that determine whether and how a rule 130 will be applied in a rule based operation 135. Typically, these operations 135 are associated with a predetermined and unchangeable system 100 structure, like a network of branching choices. The rule based operations 135 operate on the raw data 122 and/or metadata 124 to produce a final result that is displayed as output 140. These rule based operations 135 are typically done in the batch mode (one time for each raw data/metadata set 122 and set of selection parameters provided by the user 110.) This output display 140 is the single optimal result for the given data 120 being constrained by the rule-based operations 135. Only a completed result is presented as output 140 for each run of the system 100.

After the output is presented, the user 110 evaluates 113 the output 140 and determines whether or not the complete output 140 is satisfactory. If not, the user is sometimes permitted to modify 155 a set of parameters 150. Parameters 150 are variables that the user is permitted to change before running the system 100. Parameter changes are changes that may select which of the set of pre-determined rules are applied and/or how a predetermined rule is applied. However, parameter changes do not add new rules nor do they change how the rules relate to one another, i.e., the user 110 is not allowed to change the system 100 structure (e.g. network) itself. The user can also change the raw data 122. After these changes are completed, the user 110 runs the system again to obtain another output 140 based on the data 120 and/or rules 130 with the new parameters 150.

Rule based systems 100 are used in many areas including machine part ordering, inventory control systems, elevator controls, medical diagnosis, color correction, and design of many various other systems. Rule based systems tend to be effective if the area of application is well defined, i.e., there is a known and complete set of data 120, rules 130, and rule based operations 135 that are applied to the data 122 to obtain a single optimal and complete output 140. Rule based systems 100 tend to be unsuccessfully used in areas where there is a need for the user to control or influence the final result in ways other than by defining the input data 120 and the pre-determined and changeable parameters 150. Typically in the prior art, the user can not create, delete or add rules or rule based operations 135. Prior art rule based systems 100 also do not present the user 110 with a plurality of alternative selections for system operations 135 that the user 110 can interactively analyze, select, and constrain to produce alternative results. Outside of some parameter 150 definition and choices at the outset, there is no opportunity for the user to "explore" alternatives or for the user to use personal preferences, subjective opinion, or intuition to influence the final output 140 of running the rule based system. That is, in prior art rule based systems the user does not influence the development of the completed result. For each run of the system 100, the output 140 is a completely determined by the initial data (and sometimes by parameters) provided by the user. The user has no input during the development of the completed output 140.

FIG. 2 shows a typical prior art interactive system 200. In contrast to rule based systems 100, interactive systems 200 give the user 110 access to the individual system operations 230 and the user 110 selects 260 choices 250 associated with a given operation 240. Each choice (typically 251) for each operation (typically 241) contributes to an interim result 270. However, it is the user 110, not the system 200, who decides (typically 261) which operations 241 and which choice(s) 251 for each operation 241 to use. The user 110 can select 235 any of the n operations 235 offered by the system 200. Each selected operation and operation choice changes the system output. Thus the results of interactive systems are interim results 270 that are modified and remodified by the user selections until the user decides when and if the interim result is final. Therefore, a series of interim results 270 is used to "build" or "develop" each of the interim result 270 over a number of iterations. Contrary to prior art rule based systems 100 that run just once with no user intervention (interaction) to produce a completed result/output 140, interactive systems 200 run a plurality of times with user interaction producing a series of interim results 270. These interactive systems allow the user to define parameters and give the user a large amount of control to affect and develop the output of the interactive system. However, prior art interactive systems do not offer the user any guidance or assistance for "developing" the interim result(s) 270. These prior art interactive systems tend to be less useful in problems where there are many possible operations and where each operation has many possible choices. In these situations, there are a large number of ways the interim result can be "developed".

An example of a prior art interactive system is a typical spread sheet program. These systems typically have data 220. As with the rule based system 100, the data may comprise metadata 224, and algorithms 226 for generating the metadata 224 from the raw data 222. The system 200 has a set of predefined operations 230, e.g., "access files, input data, create graphs," etc. The user 110 chooses one (or more, see below) operations. For each operation 230 (or set of operations, see below) the user 110 selects 235, the system 200 presents the user with a set of choices. For instance, if the user 110 selects 235 an operation 1 (241) like "access files", the system 200 presents the user 110 with a set of choices 251 associated with the chosen 235 operation 241. An operation like "access files" might have a fixed set of selections 251 including: "get a file", "store a file", "erase a file", "copy a file", "move a file", etc. Mathematical operations 241 to be applied to data 220 (i.e., element(s) of the spread sheet) may have an infinite set of choices 251. Presentation (workstation display screen or printed page) operations 241 may have a large set of choices 251 with respect to, for example, alphanumeric font, size and color, or column width and row height for the entries in each row and column. For any of the operations the user 110 selects 261 one of these choices. The system 200 then applies the selected operation(s) 241 with the selected operation choice (s) 261 to the data 220 to create the next iteration of the interim result 270. There can be any number of operations selected 235 and selected choices 261 for each operation. Also, any given operation/choice may only affect a part of the result 270. A mathematical operation may affect a single element, a collection of elements or all of the spread sheet data 220 to affect part or all of the interim result 270. The choice selected for the the "access files" operation, affects the whole result. In all cases there are no concurrent operations possible. For example, the interim results of different presentation operations affect each other. If the user 110 selects a large font size for the presentation of 12-digit numbers, the presentation of the entire number may not fit within the defined presentation element size (row height and column width). This would only be apparent in viewing the interim result 270. Since such a prior art interactive system does not have guidance in the selection of choices for operations nor feedback among operations and selection of choices, the user must then iteratively invoke an operation 241 to change the column width and/or height with specific choices 251 to get the presentation correct, which is only apparent via the interim result 270. Therefore, each iteration is only one step in developing the interim result 270 of that series of the interim results 270.

Further note, as shown in FIG. 2, that prior art interactive systems 200 can have a set of operations 240 and a set of choices 260 for each operation 241. Some of these systems, e.g., IBM Visualization Data Explorer (a trademark of the IBM corporation) allow the user 110 to select one or more operations (235) and/or to select one or more choices (261). The effects of these multiple selections are then reflected in the interim result 270.

In the prior art interactive systems 200, the user 110 is offered no rule based assistance in making these selections (235 and 260). Accordingly, the user 110 may be presented many interim results 270 that may not meet the user's requirements 215. A large number of operations 230 and choices 250 can make selecting operations 235 and operation choices 260 confusing.

STATEMENT OF PROBLEMS WITH THE PRIOR ART

Prior art rule based systems 100 give a user a single best result from a data tightly constrained by a set of rule based operations. However, these systems prohibit or strictly limit the user's ability to participate in the intermediate steps of developing the completed result. These systems 100 also do not allow the user to actively interact with the rules and operations which make up the problem solving function of the system or to explore alternative relevant results outside of the pre-defined rules/operations. Alternatively, prior art interactive systems 200 allow the user to select operations 235 and/or choices 260 but do not use rule based operations to suppress inappropriate, irrelevant, and even deleterious selections from being presented to the user and contributing to the problem solution.

Prior art rule based systems 100 work well if there is: a well defined set of data; a set of rules that defines every possible set of outputs; an "optimal result" that is not subject to user opinion or knowledge; and one optimal result that is sought. While the user can re-run the rule based system over and over by changing some limited rule parameter set, this is an indirect, limited, and awkward way of imparting the user knowledge to the final output/result. Prior art rule based systems are ill suited in situations where the user wants to: use subjective criteria; use user knowledge which may not have been built into the system; influence the result with a creative license; and/or participate in developing the result. Prior art rule based systems are also ill suited where a single optimal result does not exist and/or the results can not be completely defined by rules, and/or the data should be changing as a result of the rule-based operations.

Prior art rule based systems 100 limit the creative and intuitive input of the user by focusing on a single, complete result that conforms to a set of rigidly defined rules programmed into the system. Prior art rule based systems do not allow users direct access to the operations used in solving the problem, the rules that constrain these operations, or the possible choices associated with each operation. Prior art rule based systems determine which operations are applied to the data to produce a single, complete, and final result. Since the rules and operations are predefined in prior art rule based systems it is difficult for a user to explore the affect of alternative rules and operations. Prior art expert systems do not permit the user knowledge and preferences to directly contribute to the result, or to steer the solution.

On the other hand, prior art interactive systems 200 can give the user too much information and/or too many results. Much of this information and many of these results can be confusing and irrelevant to the user's requirements. These systems 200 do not offer any guidance to the user to eliminate irrelevant results. These systems 200 do not provide the user with any systematic approach to converge "developing" interim results to a preferred, final result.

Some prior art systems have been applied to the area of visualization. These visualization systems offer interactive control over the selection of operations. For example, a visualization software system might offer a rich array of transformations, processes, color maps and realization strategies. Likewise, modern workstation customization tools may allow selection of various colors and fonts for the user interface. In both cases, the systems do not generally provide guidance to the user in the appropriate selection or application of these operations. In those systems which do offer guidance, selective application of this guidance is not under user control. This is a problem because modern systems are very complex with a wide range of operations and choice in the invocation of operations. Without guidance, the system capabilities are used inefficiently, and the application of operations is largely ad hoc. For example, in a visualization application, often countless iterations are required to create an appropriate color map or to get a color right, iterations which could be greatly reduced if the user had easy access to guidance about color mixing rules. In a workstation customization application, many days are often spent adjusting colors and fonts, arriving at combinations which may not be aesthetically pleasing or even legible.

OBJECTS OF THE INVENTION

An object of this invention is an improved rule based system architecture that interactively gives a user a plurality of rule constrained choices that are applied to data to produce one or more interim results.

Another object of this invention is an improved rule based system architecture that interactively gives the user a plurality of rule constrained operations and/or operation choices that assist the user in developing iterations of interim results that each reflect user knowledge and/or preferences.

A further object of this invention is an improved rule base system architecture that assists a user in presenting and visualizing data by providing intelligent assistance based on perceptual rules.

SUMMARY OF THE INVENTION

The present invention is a novel rule base system and method that interacts with a user to provide the user a series of interim results. Typically, each iteration of interim result in the series has user input that is used to further develop the later interim results of the series. The system has a set of one or more operations. Each of these operations in turn has a set of one or more choices, called a choice set, associated with an operation. Rule based intelligence is applied to the operations set and/or one or more operation choice sets by a set of rules associated with its respective operation and/or choice set. When one or more rules in a rule set are applied to the operation set, an offered operation set is created which is a subset of the operation set. Only the operations in the offered operation set are offered to the user. When one or more rules in a rule set are applied to a choice set, an offered choice set is created which is a subset of the choice set. Only those operation choices in the offered choice set are offered to the user. The operations (operation choices) that are in the offered operation set (offered choice set) are those that conform to the constraints of the rules that are applied. Note that a subset may include all the members of the operation set (choice set).

For each iteration, operations and/or choices associated with these operations are offered to the user through the offered operation set and/or the offered choice set. The user selects from the set of offered operations and/or offered operation choices. Each of these selected operations and/or choices are applied to system data to affect various parts of the interim result. In a novel way, information about the user choices feeds back to the rules as certain data, preferably metadata, that becomes one or more parameters in one or more of the rules. In this manner, each interim result is affected by the operations and/or choices in a way that is consistent with the selection of the user at each iteration. These user selections are a reflection of the knowledge and preferences of the user at any iteration in the series of iterations.

The system also allows the user to change (add, delete, or modify) the system rules, operations, choices, data, metadata, and algorithms (used to produce metadata) that ultimately affect the interim results. For example, the user can change metadata that is used as a parameter in one or more rules that in turn changes the operation of those rules in the system. The user is also able to select which operations and/or choices associated with operations are constrained by rules. In this way, the user further directs the development of the interim results. Ultimately, the user may or may not determine that one of the interim results is final.

BRIEF DESCRIPTION OF THE DRAWINGS

FIG. 5 is a drawing of a metadata structure.

FIG. 13 is a graph showing the relations defined in some novel perceptual rules used by the example embodiments.

DETAILED DESCRIPTION OF THE INVENTION

Figure 1:
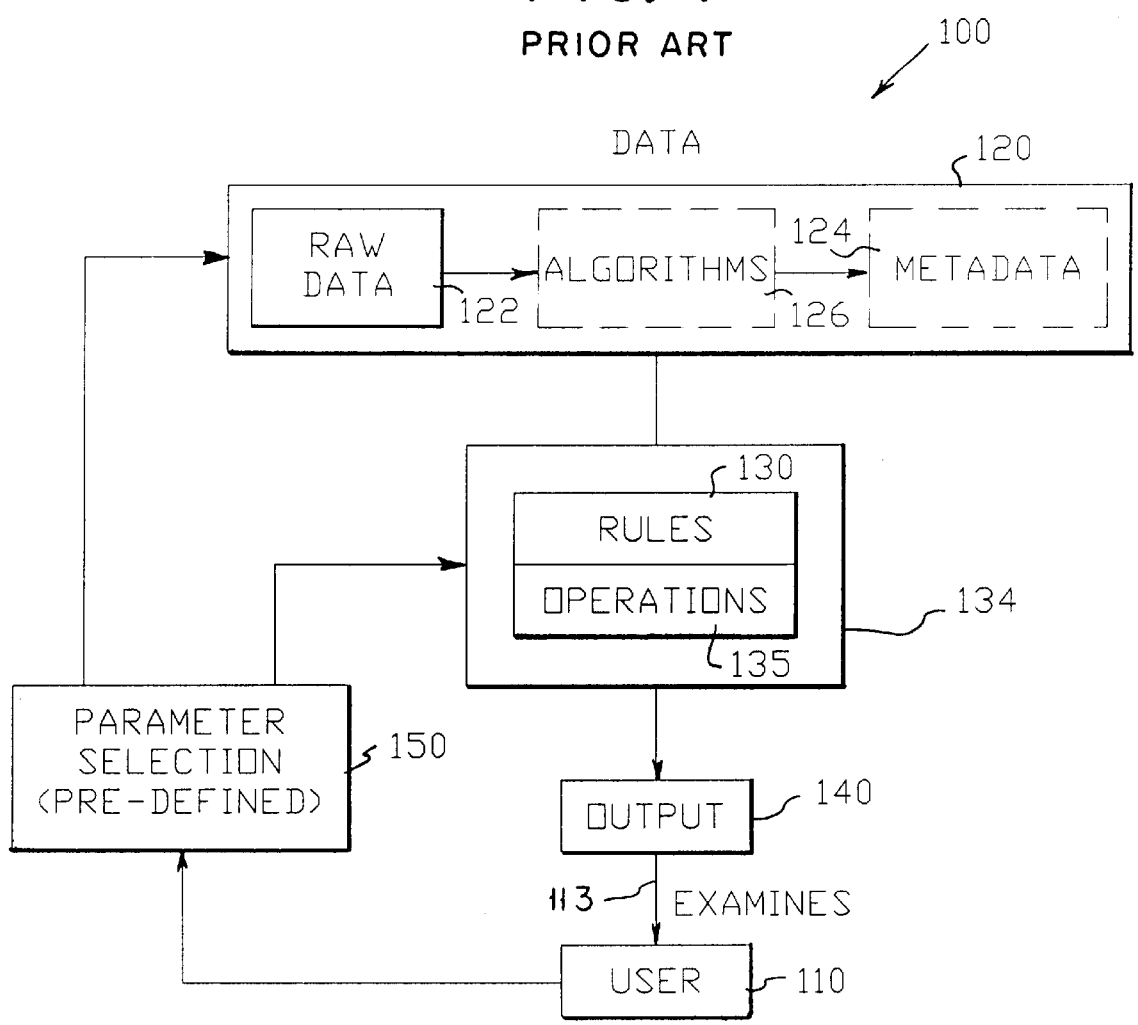
FIG. 1 is a block diagram of a typical prior art rule based system.
Figure 2:
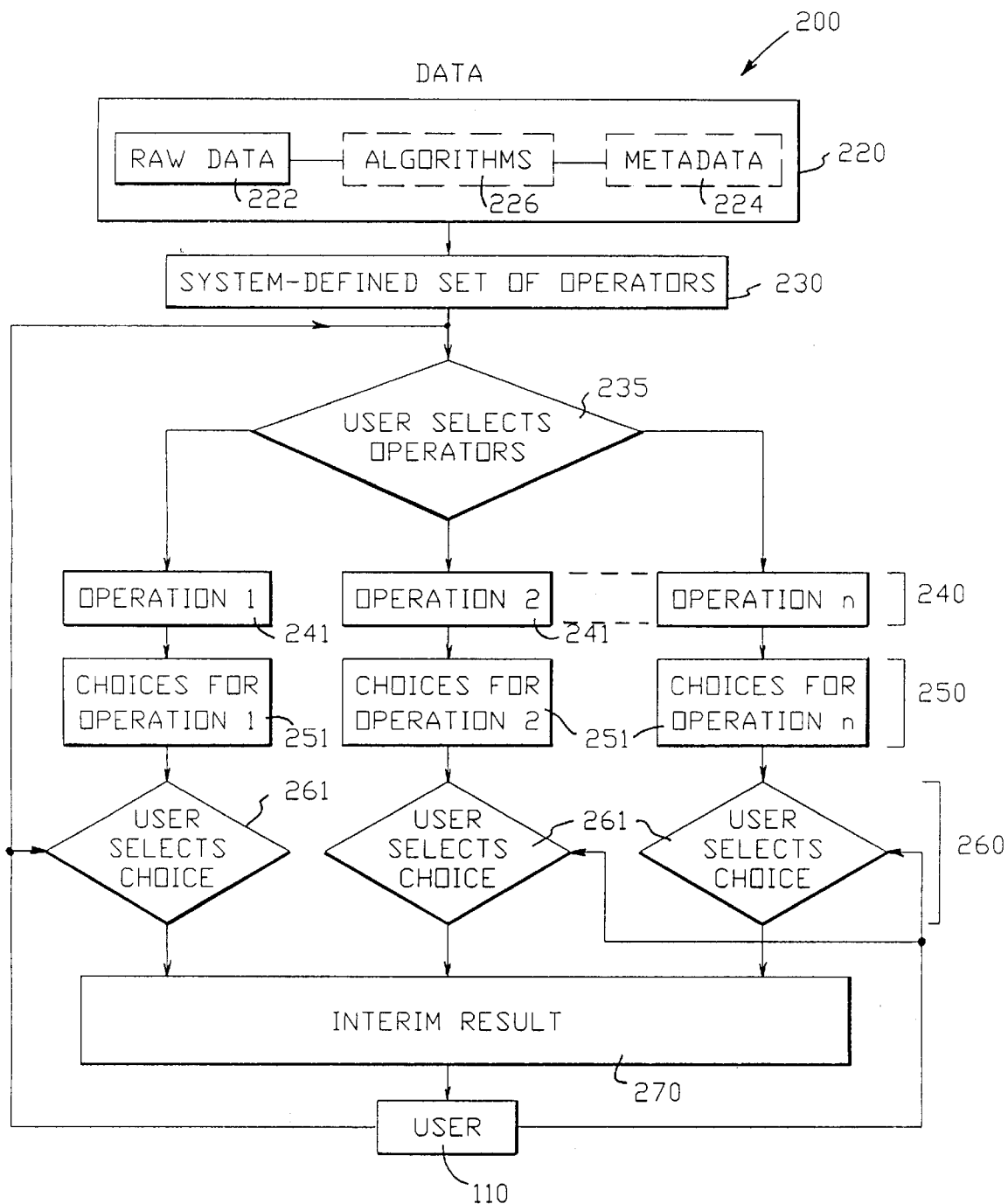
FIG. 2 is a block diagram of a typical prior art interactive system.
Figure 3:
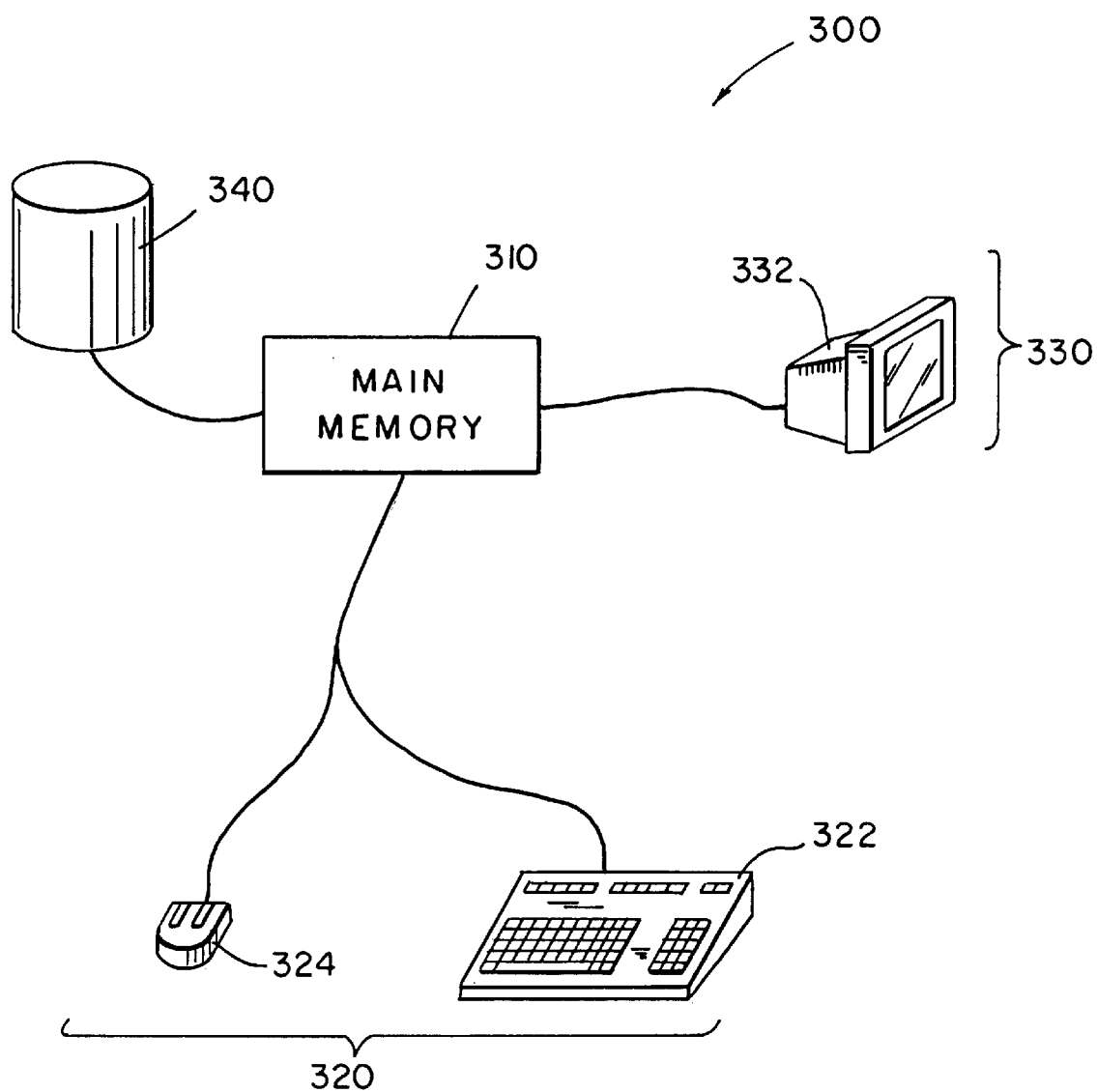
FIG. 3 is a block diagram of a typical computer system that is executing the present invention.

FIG. 3 is a block diagram of a non-limiting example of a typical computer system 300 used to execute the present invention. A computer CPU with a main memory 310 is connected to input devices 320, an output devices 330 and bulk memory (that includes memory storage external to the CPU) 340. The particular system shown here is an IBM RISC System/6000 (a trademark of the IBM Corporation), with a high-resolution visual display 332 and a keyboard 322 entry device and a mouse 324. This system could be generalized to accommodate any number of input devices 320 (e.g., a tracker output from a Virtual Reality system, voice input, etc), and can be generalized to accommodate any number of output devices 330 (e.g., a simple monochrome text display, a multimedia video/text/image display system, a 2-D stereo head-mounted display for a Virtual World environment, a three-dimensional computer-generated hologram, etc). The system of FIG. 3 can be generalized to a multi-user system with multiple inputs and outputs. Systems 300 like this and their operating systems are well known and within the contemplation of the inventors.

Figure 4B:
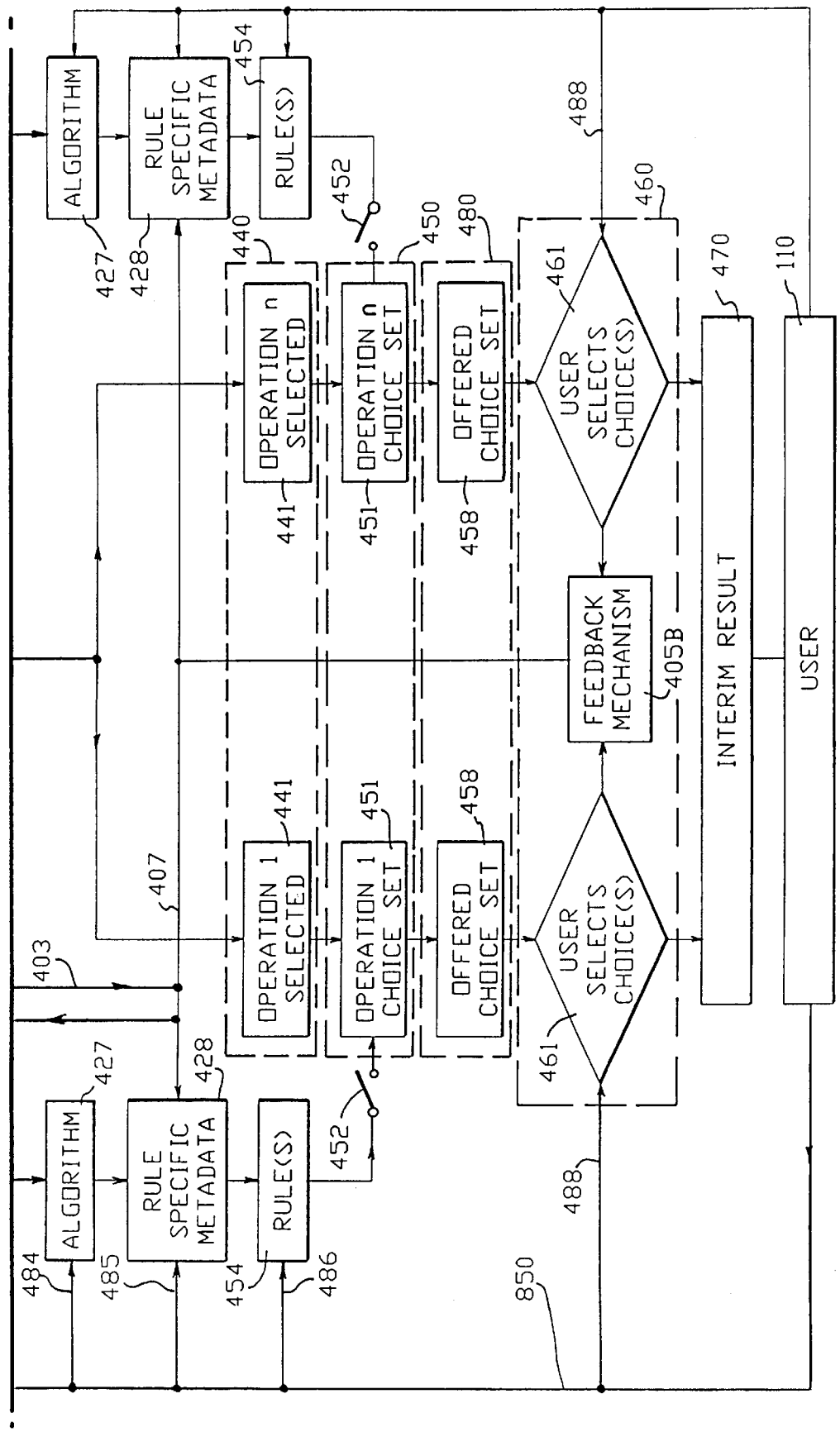
FIG. 4, comprising FIGS. 4A and 4B, a general block diagram of a preferred embodiment of the present invention.

FIG. 4 is a block diagram of the present invention 400 showing the functional components of the invention and how they interrelate. Generally the core infrastructure of the system is derived from an extension of a prior art interactive system 200. However, the system includes several novel features. A set of rules 434 can be selected 432 to be applied to a system 400 set of operations (operation set) 430 to produce a set of operations that are offered (offered operation set 438) to the user 110. These offered operations 438 in the offered operation set 438 conform to the constraints of the rules 434. In like manner, another set of rules (typically 454) can be selected (typically 452) to be applied to a set of operation choices (or choice set, typically 451) associated with each operation selected 435 by the user 110. Application of the rules 454 produce a set(s) (typically 458) of operation choices that are offered to the user (or offered choice sets 458). The user selections of operations 435 and selections of operation choices (typically 461) are monitored by a novel feedback mechanism(s) (typically 405). The feedback mechanism 405 provides information back to the rules (434 and/or 454) as parameters preferable through a novel type of metadata called rule specific metadata 428. In addition, the user 110 is provided with several more novel features which allow the user to add, delete, and modify operations 430, operation choices 450, rules (434 and 454), rule specific metadata 428, and rule specific metadata algorithms (typically 427). The user selected operations 435 and operation choices 460 are applied to the data 420 to produce the interim result 470.

The system 400 has data 420 that includes raw data 422 and metadata 424 which is data about the raw data 422. In some preferred embodiments, a raw data algorithm 426 is used to produce some or all of the metadata 424 from the raw data 422. Metadata 424 also includes data that the user directly enters.

Non-limiting examples of raw data 422 include data from scientific calculations, sensor observations, model predictions, retail sales statistics, and graphical representations of user interfaces, architectural drawings, cad/cam schematics, etc. These data 422 and structures for storing and accessing these data are known. The data resides on the memory of the computer system 300, e.g., the bulk memory 340. Metadata 424 about raw data 422 and algorithms 426 for creating these metadata 424 are known. For example, the raw data 422 could be the distribution of temperatures in the earth's atmosphere as a function of geographic location. Metadata 424 about this raw data 420 might be the rate of temperature change with respect to elevation, minimum and maximum temperatures at a given latitude, temperatures normalized by pressure, spatial location transformed for spherical coordinates, etc. In some preferred embodiments of the invention 400, some or all of the metadata 424 is provided by operating on the raw data 422 with an algorithm 426. For example, an algorithm that takes the derivative of temperature with respect to elevation can provide metadata 420 that shows how rapidly temperatures change as the elevation from sea level increases. Other algorithms may transform the locations on the earth to a more appropriate cartographic coordinate system. Another example of raw data would be the data in a scientific experiment consisting of an array of numbers. A metadata algorithm could produce metadata which represents the variability or bumpiness of the data, or segregate the data into spatial regions, etc. The metadata algorithm can also be used to characterize relationships between elements in the data set, for example, spatial relationships in 3-D space (in front of, behind), temporal relationships (before/after), temperature relationships (colder/warmer).

Data structures for these raw data 422 and metadata 424 and algorithms 426 for generating metadata 424 are known. These data 422, metadata 424, and algorithms 426 are provided 421 by the user 110 or the system designer and are stored via known methods.

The invention also has a type of metadata called rule specific metadata 228. Some of this rule specific metadata 228 may be created by special algorithms called rule specific metadata algorithms (typically 427) using known methods. The rule specific metadata 428 values may be used as one or more values of parameters in one or more of the rules (434, 454) of the system 400.

There are several novel features about rule specific metadata 428. For example, rule specific metadata 428 can also be provided by the user through access paths (482, 485). Also, some or all of rule specific metadata 428 values represent information about user 110 selections (435 and 460) that are used as values of rule parameters. This is part of a preferred feed back mechanism 405 that provides information about user selections to the rules (434, 454).

Note that in this non-limiting description, the raw data 422, metadata 424, and rule specific metadata 428 are shown separately because they have different functions. However, this information can be stored in any number of ways that are known, including in the same storage location.

FIG. 5 shows one preferred example of a metadata data structure 500 that is used by the present invention 400 as rule specific metadata 428. In this example, metadata 500 is divided into different categories (shown as columns in the metadata structure 500). These categories might include data which are relevant to rules 510, rule specific metadata computed from an algorithm 520, rule specific metadata about user selections 530, and user provided rule specific metadata 540 that reflects user goals and knowledge. Note that in this one preferred embodiment, a set of rule specific metadata 428 is associated with a specific rule set (like 434 or a typical 454).

Relevant data 510 for specific rules is a class of data (either 422 or 424) necessary for a rule (434, 454) to be applied. For example, information given by switch (432, 452) determines whether or not a rule set will be applied. Further, this rule set 454 could only be applied if the prerequisite metadata would be available. For example, a specific rule 454 might only be allowed to be applied if the metadata are weather data corrected for atmospheric pressure.

Another category of metadata 500 is additional metadata computed from algorithms 520. In a preferred embodiment, these algorithms 427 are associated with the rule specific metadata 428 and a set of rules (434, 454). These algorithms (typically 427) create rule specific metadata 520 by known methods. For example, an algorithm that integrates the tissue density in a volume of cortex provides metadata related to tissue type.

Another category of metadata 500 that is the novel metadata about user selections (435, 461) that is used in one or more rules (434, 454). This data 530 can affect a rule by being a parameter of the rule (see below.) This data 530 is provided by the feedback mechanism 405. An example of user choice metadata 530 would be a variable, $s_1$, that indicates that the user has selected a black display background. A rule determining text color would receive information about this selection and could thereby constrain the set of text color choices to high luminance (bright) colors and not offer to the user low luminance (dark) text color choices.

Another category of metadata 500 that is novel is user provided rule specific metadata 540. This metadata 540 typical reflects user knowledge and goals and is provided directly to the metadata structure 500 by access paths 482 and 485.

Nonlimiting examples of user provided rule specific metadata 540 might include whether data in a visualization application should be represented continuously or whether certain ranges should be highlighted, and whether a domain specific constraint should be used or not (e.g. in astronomical applications, red connotes cold and blue connotes hot, but the opposite convention is used in meteorology.)

Note that given this disclosure, other categories of rule specific metadata 428 and types of metadata structures 500 would be apparent to one skilled in the art given this disclosure. These are contemplated by this invention.

Rules (434, 454) are applied to data 420 to produce some result. Therefore, rules (434, 454) and data 420 must be constructed in a way which enables this inter-operation to occur. Prior art rule based systems 100 disclosure many examples of this in order to provide their completed output/ result 140. For example, rules (434, 454) can be expressed as a set of constraints. Alternately, the rule may use optional parameters or inputs to determine which of a number of operations it performs (algorithmic rules). The domain of these rules is limited only by the domain of the application, and may include, for example, perceptual rules, architectural rules, design rules, grammatical rules, color harmony and aesthetics rules, spatial layout rules, cartographic rules, device independent color rules, machine assembly rules, equipment configuration rules, Boolean logic, fuzzy logic, propositions, mathematical problem solving rules, etc.

In one preferred embodiment of the present invention 400, a given set of rules is associated with a particular set of operations. For example, the set of rules 434 is associated with the set of system 400 operations 430 (operation set). Further, each set of rules 454 is associated with a particular set 451 of operation choices (choice sets) in the total set 450 of operation choices. These associations do not preclude the sets of rules (434, 454) from having one or more rules that are duplicates of rules in other sets of rules or for a rule to have parameters in common with other rules. The rules (434, 454) are designed to pick operations or operation choices to offer the user. The offered set of operations 438 (offered operation set) and offered sets of operation choices (set of offered choice sets 458) include the operations and operation choices 480 that conform to the rule constraints. Thus, offered operations/operation choices, when applied to the data 420, will produce interim results 470 that conform to the active rule constraints.

For example, if the goal is to select a color map to uniformly represent the measurements of air speed of air flowing over an air plane engine nacelle, then the set of choices 480 would include only a limited set of coloring schemes selected by the rules 454.

The present invention provides rule based intelligence that can be invoked or suppressed, i.e., switched, by the user to assist the user in selecting operations 435 and/or choices 460. The user does this by using a novel switch mechanism (432 and 452, respectively) for invoking (suppressing) the rules 434 (454) applied to the operations set 430 (and/or choice set 451). This switching (432, 452) can be enabled by conditionally executing rules base on a Boolean value of the switch 432 (452) selected for each operations set 430 (choice set 451). The user 110 can be offered options on the display 330 to invoke (suppress) a given set of rules (434, 454) and can toggle the switch (432, 452) to select which rule(s) or rule sets are applied using input devices 320. If the user invokes a set of rules (434, 454), the invoked rule set will be applied to its associated operation set 430 or set of operation choices (choice set) 451 and will offer (438, 458) the user 110 only those operations 430 or operation choices 451 that respectively meet the constraints of the rules (434 and 452, respectively). However, if a given rule set (434, 454) is suppressed, the entire operation set of operations 430 or choice set of operation choices 451 is respectively offered (438, 458) to the user 110 without the aid of rule intelligence.

Given this disclosure other implementations of this switching mechanism (432, 452) would be evident to one skilled in the art and are within the contemplation of this invention. For example, the switch (432, 452) may be variable, not discrete, in which case the effect of the rules could be varied continuously providing degrees of influence over the set of choices 451 offered to the user 110.

Also, the system 400 can have a set of one or more operations 430. The user 110 selects 435 one or more of these offered operations 438 to obtain a set 440 of one or more selected operations 441. The selected operations 440 are applied to the data 420 or give operation choices that are applied to the data 420 to produce an interim result 470.

One novel feature of the present invention is that rules (434, 454) can be selectively (432, 452) applied to operations 430 and operation choices 451 to offer the user 110 only those operations 438 and operation choices 458 that meet the constraints of the rules. The user 110 at the same time can examine operation choices 451 for other selected operations 441 to see how these choices vary as different other choices are selected. For example, the user 110 selects operation choices 461 from those offered 458. One or more selections 461 can be made at a time. The user can make a discretionary selection of operation choices associated with a first selected operation or make a selection of operation choices associated with operations other than the first selected operation. The selected operation choices 461 of offered operation choices 458 along with the user selected operations 435 are applied to the data 420 to produce the interim result 470. Note that since the data 420, rule specific metadata algorithms 427, rule specific metadata 428, and rules (434, 454) also affect the choices offered the user, they also directly affect the interim result 470.

By applying the user selected operations 435 and operated choices 460 to the data 420, a interim result 470 is produced. The interim result is presented to the user 110 on the system output device 330. In a preferred embodiment, a plurality of interim results 470 are presented to the user 110, one after each user selection of operations and/or operation choices, i.e., after each iteration of the system. A critical aspect of the interim result 470 is that it can provide partially complete visual, tactile or auditory input to the user, at an intermediary point during the development of a full solution. This permits the user to evaluate and judge each interim result 470 and incorporate user knowledge, judgement, and preferences after an iteration to produce the interim result 470. The user knowledge, judgement, and preferences are inserted into the development of the series of interim results by modifying either the data 420 (by path 421), rule specific metadata algorithms (by paths 481, 484), rule specific metadata (by paths 482,485), rules (by paths 483, 486), selection of operations (path 487), and selection of operation choices (path 488). Using known methods, the user 110 can store any number of interim results in the series in order to compare the performance of modifications and selections.

For complex, multidimensional design problems, where current rules are inadequate to conceptualize and model the solution space, the user can select operation and/or operation choices and/or modify the data/rules to achieve a preferable result. Allowing the user to participate in the developing of a partially complete interim result 470 means that the system designer doesn't have to design a complete system because the "gaps" can be filled in by the user. The system designer can specify a framework of partial solutions, and the user can provide the additional information to achieve a complete solution, customized according to the user's tastes, judgement, preferences, and knowledge. Since rules can be interactively modified by the user, information learned by the user during "what if" experiments with the system can be incorporated interactively as rules.

Another novel feature of the present invention 400 is that it feeds back 405A information about the user selections 435 of operations and feeds back 405B user selections (all 461's, i.e.,460) of operation choices to appropriate rule specific metadata 428 for the operations 403 and rule specific metadata 428 for the operation choices 407. In one preferred embodiment, this is accomplished by identifying which rules used data provided by the user selections (435 for operations and 460 for operation choices). In one preferred embodiment, this information is stored in the rule specific metadata 428 (s 530 in FIG. 5). An algorithm is used to track when the required user selection information (435, 460) is altered, i.e., every time the user 110 makes a selection (435, 460). The user selection information then is updated in the appropriate storage location 530 of the metadata structures 500 that contain the variable, s 530. Algorithms such as this will be known to one skilled in the art that is given this disclosure. The path for this feed back of user selection information is shown as path 403 (407) for user selected operations 435 (user selected operation choices 460, respectively). In this manner, the correct value of variable s 530 in the metadata structure 500 is provided to each rule that has the variable s 530 as an argument.

The user 110 examines each interim result 470 and determines whether or not to continue with the development of the next interim result 470 in the series of iterations. As discussed above, the user can continue the development of the interim result 470 by making selections of operations 435 and/or operation choices 460. In addition, the user is permitted to further develop the interim result 470 by changing one or more rules in the set of rules 454 associated with a set of operation choices 451 through a feed back path 486. The user 110 can also change the rule specific metadata 428 associated with this rule set 454 through a feed back path 485 and the rule specific metadata algorithm 427 associated with this rule set 454 through a feedback path 484. In like manner, the user can change the respective rule set 434, rule specific metadata 428, and the rule specific metadata algorithm 427 for the associated set of operations 430 by the respective feed back paths 483, 482, 481.

Figure 6:
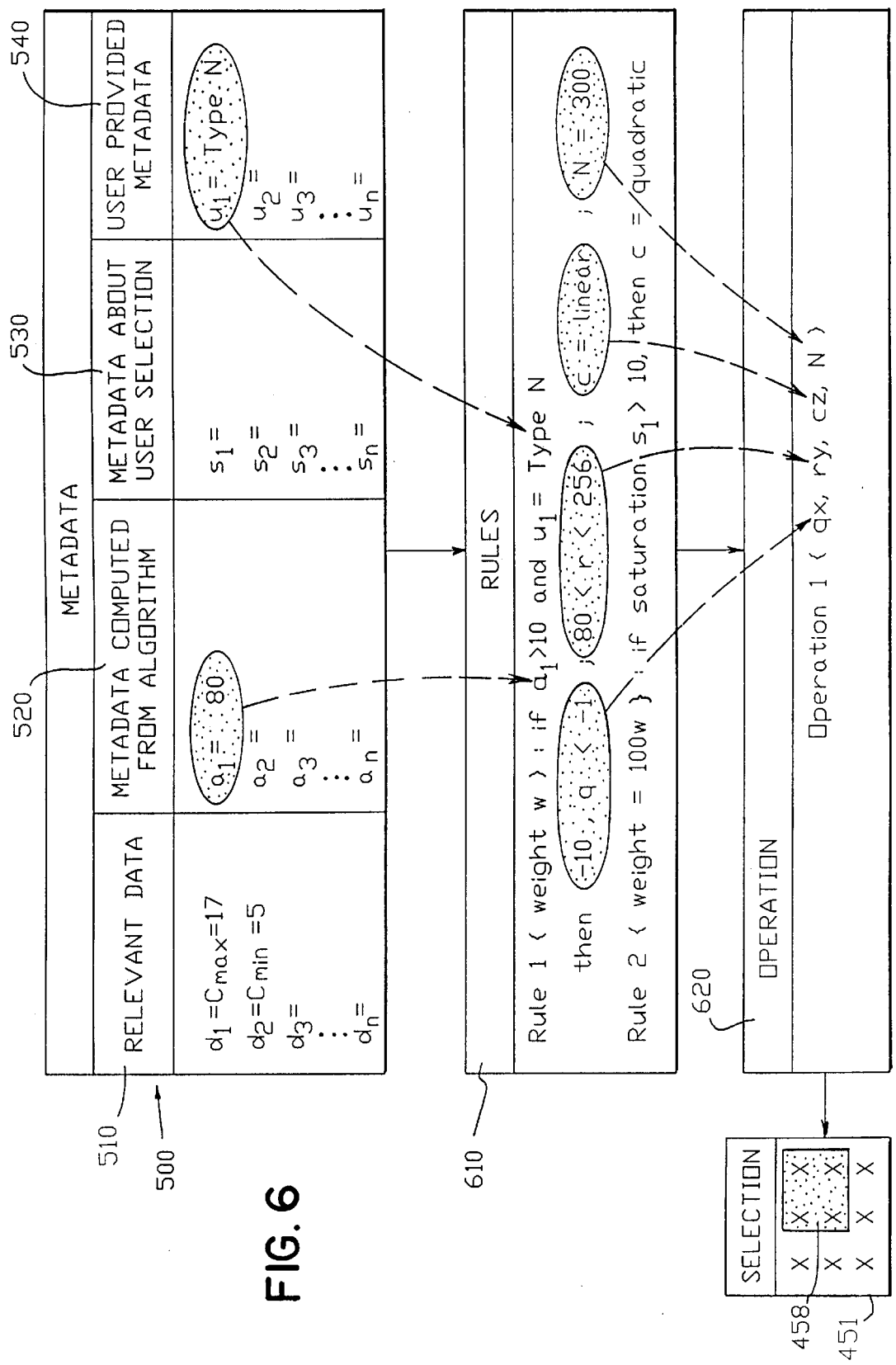
FIG. 6 is a drawing of a general case preferred embodiment showing how metadata, rules, and operations interact in one iteration of the invention.

FIG. 6 shows the interaction of metadata, rules, and operations, and an operational representation of the mechanism by which the rules constrain the set of choices offered the user. The top box in FIG. 6 replicates 500 of FIG. 5.

Four categories of metadata are shown with an arbitrary number of values stored within each category. Values of relevant data 510 are indicated as $d_1 \ldots d_n$, and in this example, include the maximum and minimum values of an array of raw data 422. Rule-specific metadata computed by algorithm(s) 520 are denoted as $a_1$ asubn, and this example shows a value of $a_1$ to equal 80. There are no values provided for the metadata about user selections 530 shown as $s_1, \ldots, s_n$, since, in this example, the user has not yet made any selections. Metadata provided directly by the user, shown as $u_1 \ldots U_n$, includes the value "Type N" for the variable $u_j$.

In this invention metadata 428 provides input to the rules (434, 454). In this example, the rules are expressed as a set of propositions. The first rule reads: If $a_1$, is greater than 10 and $U_1$ is of type N, then the value of q is constrained to a range between $-10$ and 1, r is constrained to a range between 80 and 256, C is linear and N is equal to 300. This can be read as: If the spatial frequency of the array is high, select color maps such that the starting value is in range q, the ending value is within the range r, and construct the intervening values by linearly interpolating between the values, with 300 steps. The values input to the rule, $a_1$ and $u_1$, were provided by the metadata. As a consequence, the rule constrained the values of q and r and provided values for c and n. These values, in turn, provide input to the relevant operation 620. This operation has four arguments which determine the set of choices offered the user (438, 458). Thus, the metadata flow to the rules, and based on this information, the rules constrain the arguments of the operations, thereby limiting the set of choices for that operation which are offered to the user 630. Notice that a change in the metadata 500, the rules 610, or the operation 620 affect the choice set 458 since the values in each flow to the variables, parameters, and arguments defining each step in the process.

In this example, the metadata (510, 520, 530, and 540) appear as single values for each variable, some numerical, some symbolic (e.g., "Type N"). Metadata 500 could also be expressed as vectors, functions, etc, depending on the requirements of the application; the representation of the Metadata is not limited in any way by this invention. In an interactive rule-based system designed to solve differential equations, for example, the metadata might include a function used to parse the equation(s) into tractable parts.

In this example, the rules 610 are expressed as propositions. This is a non-limiting example. The rules could also be expressed as a system of constraints, in terms of fuzzy logic, as a neural network, or as any other rule or constraint or optimization system which takes input parameters and provides output parameters. Likewise, in this example, the operation for selecting the subset of choices offered the user 620 is expressed as a set of arguments. The implementation of this general structure could take any form desirable for the application and is not limited by this invention.

Figure 7:
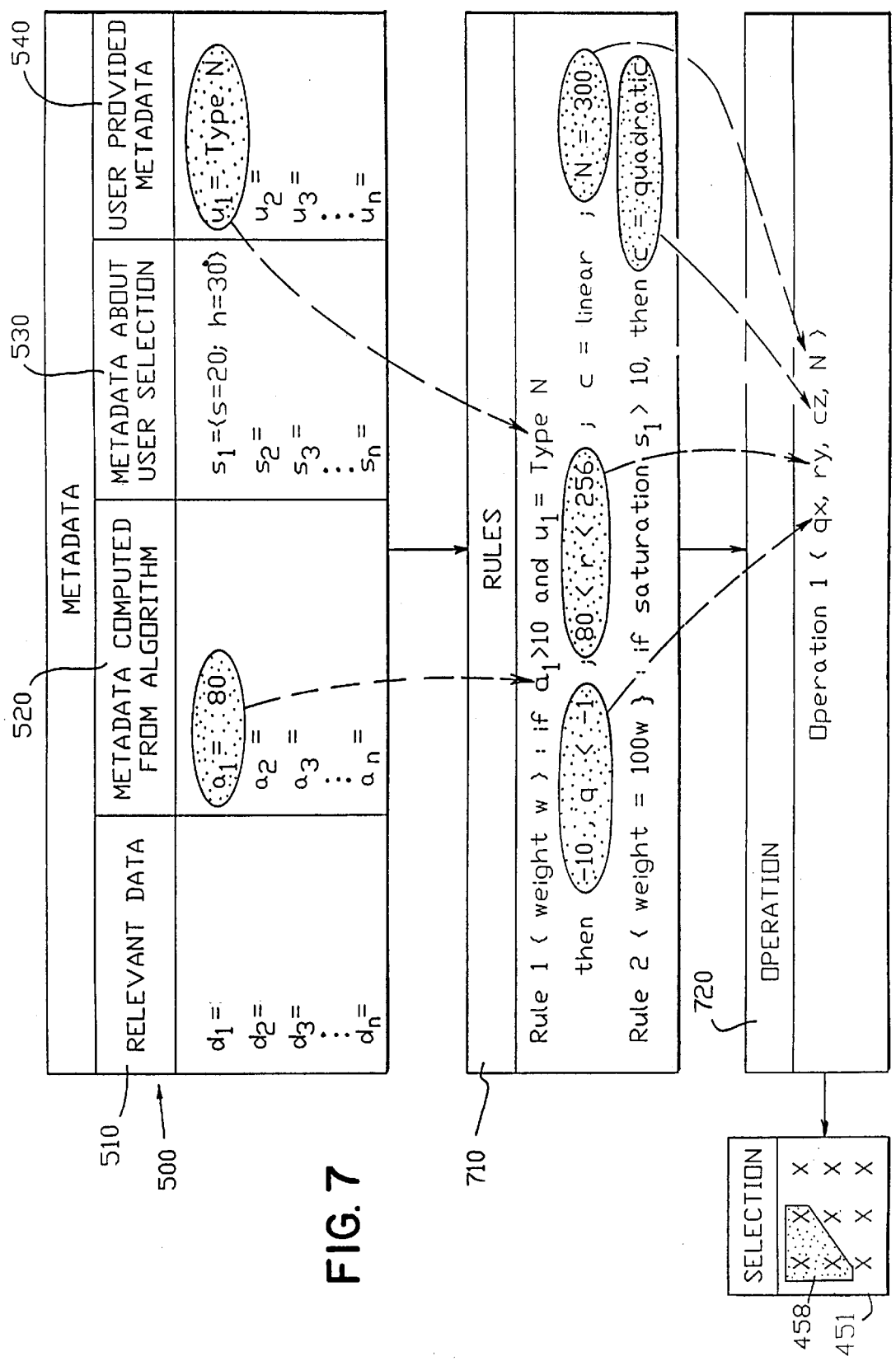
FIG. 7 is a drawing of a general case preferred embodiment showing how changes to metadata affect iterations of the invention.

FIG. 7 shows how a change in the metadata 500 percolates through this system to affect a change in the choices offered to a user. In this example, metadata about a user choice 530, $s_1$, has been added. That is, the user has selected a choice for an operation 461, and information about this choice has been fed back to the metadata 500. In this case, the user has made a color selection, and the value s=20, h=30° has been added, indicating that the saturation of the color selected is of value 20 and the hue of this selection is at a hue angle of 30°. This newly added metadata 530 is relevant to the second rule 710, which had been dormant in the the previous iteration (FIG. 6) because no value for $s_1$ had been provided. In this iteration, the rule receives the value, and the antecedent for the proposition is to set c="quadratic". In this implementation, the rules are activated when the requisite metadata is provided. Other decision mechanisms for activating rules are possible.

In this example, the two rules now produce different values for the variable c. Rule 1 calls c="linear"; rule 2 calls c="quadratic". This rule conflict is handled in this case through the system of weights associated with the rules. In this example, Rule 1 has a weight of w and rule 2 has a weight of 100 w. Since the weight for rule 2 is stronger, the parameter offered by Rule 2 provides the input to the operation which selects the set of choices to be offered the user 720. This example shows one mechanism for arbitrating between rules. The high-value wins rule-weighting system may be substituted by a more sophisticated weight attribution system, or could be replaced altogether by a system without weights which, for example, might average the values proposed by the rules, or poll for the most frequent value, etc. Likewise, the existence of conflicting rules could result in an error message to the user. The method for resolving rule conflict is left to the user and/or system designer, depending on the application, and can also be changed interactively on each iteration.

This example shows how modifications in the metadata 500 change the values sent to the rules 700, which can change the parameterization of the mechanism by which the set of choices offered to the user is determined. In this case, the novel class of metadata, metadata about user choices 530, was modified. Furthermore, every time the user makes a selection, that information is fed back to the metadata, where the parameters of that selection are recorded. That is, on every iteration, the metadata regarding user choice is modified, the rules are recomputed and the set of choices offered to the user for all affected operations is modified, reflecting the user's action. In this way, knowledge about the user's choices, knowledge, preferences, and judgments are percolated through the system, affecting all subsequent operations which depend on the parameters of those choices.

In the case of metadata about user choices 530, it is the system which updates the metadata based on the choice(s) made by the user. The other classes of metadata can also be modified, but in this case, it is the user who updates the metadata. On every iteration, the user 110 is free to modify any metadata 500, and the effect of these changes is percolated through the system by the same mechanism as was described above. To modify metadata derived from data 510, the user need only edit the raw data 422, the algorithm 426, or the metadata 424, shown 420. This can be done by editing a file containing this information, or otherwise changing the values stored in the corresponding storage location. Metadata computed by algorithm 520 can be modified by editing the algorithm used to compute that metadata. This can be done by known methods for creating algorithms, including, but not limited to selecting an algorithm from a set of buttons, editing an algorithm in a window, etc, using an appropriate language or set of commands for modifying the algorithm. User provided metadata 540 can be modified by providing a method for the user to input that information to the system. For example, a dialogue box could be provided offering the user a method for providing that information. (Note that similar methods can be used to change the operation set 430 or a operation choice set 451). This information might refer to the goal of a visualization, the preferred method for solving differential equations, a hunch where to begin the simulation, or any other information known to the user but not incorporated in the system. This information can be selected from a set of choices, can be input via a slider, or could be indicated by a pressure on data glove, depending on the application.

In summary, metadata 500 can be modified on every iteration, either by the system, reflected choices made by the user, or by the user, reflecting the user's knowledge, hunches, and intuitions about the problem and its solutions. Metadata is a major mechanism through which this intelligence is fed to the operations involved in the solution or design.

The other mechanism by which user intelligence is fed into the system is via the rules (610, 710). On every iteration, the user is free to modify the rules (610, 710) and the weights associated with the rules, in the same way described for modifying metadata algorithms (426, 427). Thus, on every iteration in this interactive system, the user is able to modify the data 420, the metadata 248, the algorithms for computing the metadata (426, 428), the rules and rule weights 454. Furthermore, for every selection the user makes for any of the operations, that information is also fed back by the system to modify the associated metadata directly.

This invention, thus, describes two mechanisms by which user intelligence is fed back to contribute to the problem solution. First, feedback about the choices the user has made for every operation are relayed by the system to the metadata. Second, the user can directly provide feedback in order to modify system behavior. On every iteration, the user can modify the data, metadata, algorithms, rules and rule weights. This feedback from the user to these system features is shown in FIG. 8, which is an expanded view of 420, 427, 428, (434 and 454).

Figures 8, 8A, 8B:
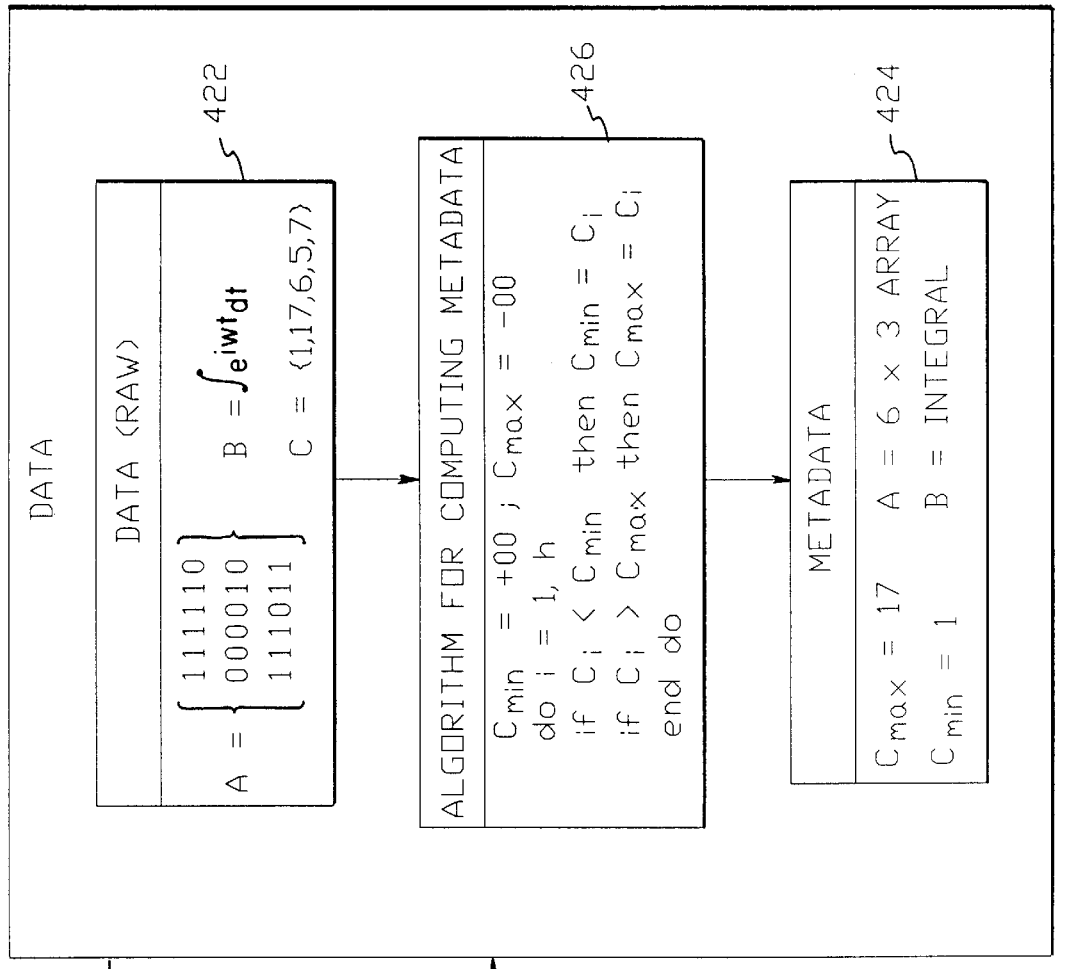
FIG. 8, comprising
FIGS 8A and 8B is a drawing showing user feed back.
Figure 8B:
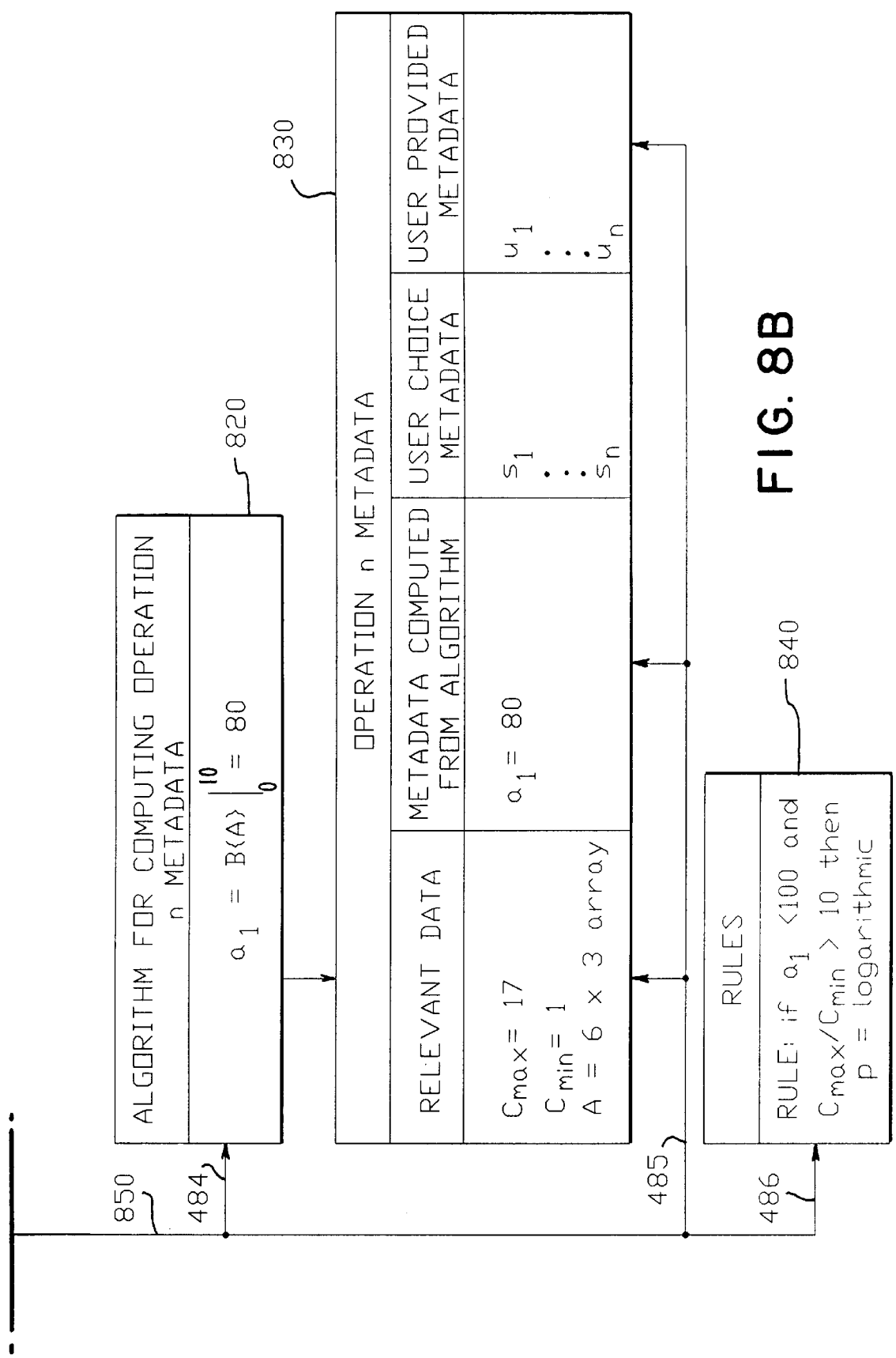

FIG. 8 shows the access paths that are available to the user to make modifications to the system. In this example, the data 810 contains three types of raw data 422: A an array, B a mathematical function, and C a vector. The data box also includes and algorithm for computing metadata 426, in this case a program is provided which sorts variable C in order to identify the maximum value. The output of this computation is stored in 424, associated with the variable $C_{(max)}$. An algorithm for computing some rule-specific metadata 820 might compute the spatial frequency of an array of numbers evaluated over the interval from 0 to 10, producing the value, 80. The computed value, the rule-specific metadata is stored in the metadata array 830 as value $a_1$. The metadata flow to the rules 840 which use these values to compute the values required to constrain the set of choices offered to the user 458.

User feedback 850 is depicted along the left margin. On every iteration, via 850, the user is free to modify the data 810 (raw data, algorithms for computing metadata and the metadata), and the algorithm(s) for computing rule-specific metadata 820 and the rule-specific metadata 830. The user can modify the relevant data data, the metadata compute by the algorithm, and the user provided metadata. The user can also modify the rules 840 and the weights associated with the rules, if applicable.

Figure 9:
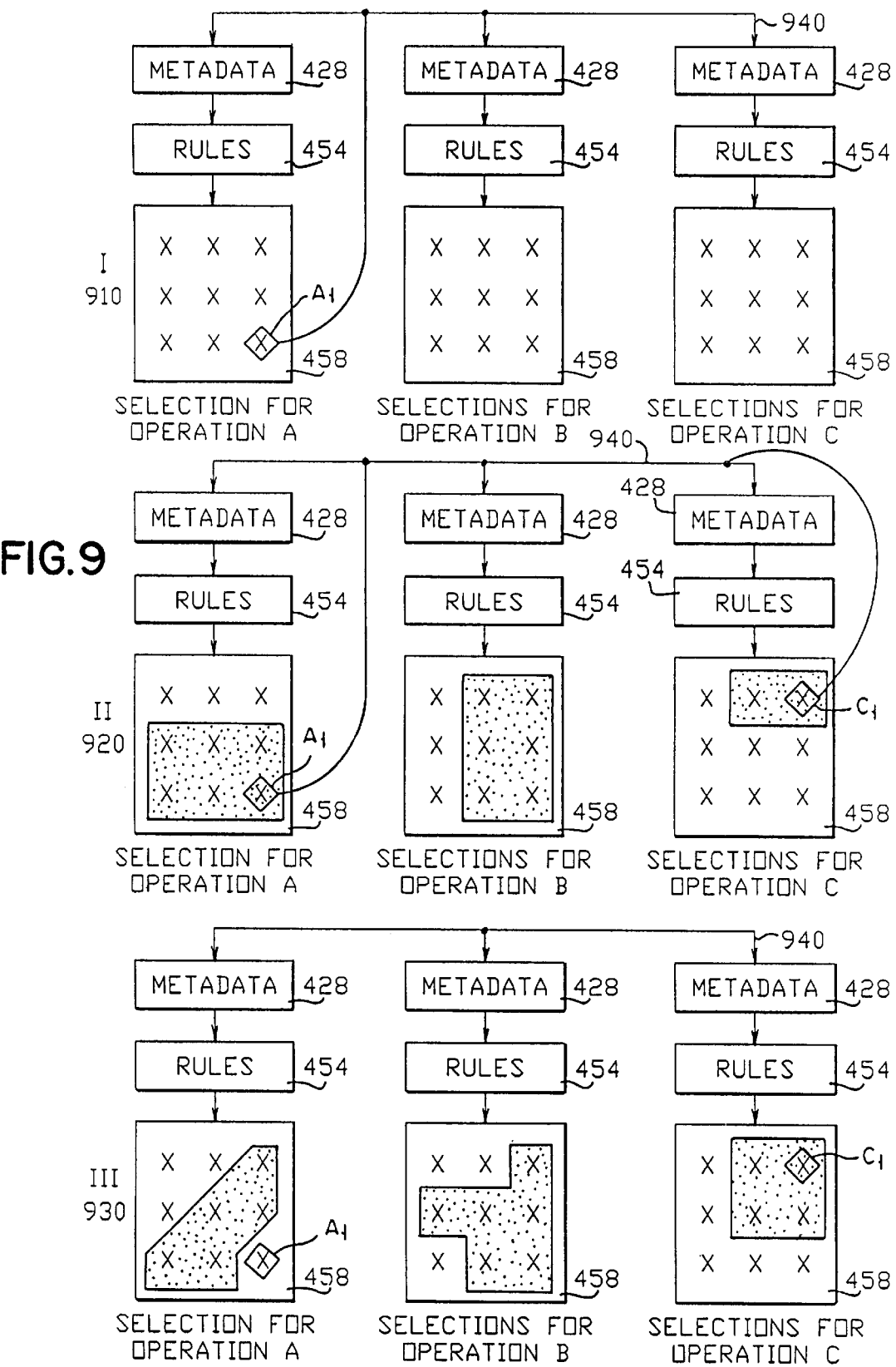
FIG. 9 is a drawing showing how user feedback affects offered choices and selections in interactions of the invention.

FIG. 9 shows how feedback from user selections affects user choices on subsequent iterations through the system. Each row shows the choice set 458 for selected operations A, B, and C, and the metadata 428 and rule(s) 454 associated with each operation. The line (940, 403, 407) connecting the metadata for the three operations indicates the feedback mechanism by which information about user selections is relayed to the metadata 428 for each operation. In the first row, the set of choices offered to the user is unconstrained, indicating that no previous selections have been made by the user and that no rules are currently in operation.

On the first iteration 910, the user selects a choice for operation A, indicated by a diamond and labelled $A_1$ in the Figure. This causes that choice for operation A (e.g., choosing a particular type of gable on a roof design to be applied to the interim solution 470 for an architectural drawing, not shown). The parameters of $A_1$ flow to the metadata 482, and are stored as metadata about user choices 930 in all three operations. These metadata flow to the rules, which modify the set of choices offered to the user 458 on the next iteration, shown in the second row 920. For each operation, a subset of the possible choices is offered to the user, indicated by the shaded regions. Next, the user makes a selection for operation C, indicated by a diamond, and the parameters of this choice are fed back to the rules 454 via the metadata 428. Again, the set of choices for operations A, B, and C are modified. Notice that this process does not necessarily narrow the number of choices available to the user, and may not even offer the user choices which had previously been offered or selected. In this case, selecting $c_1$ results in $A_1$ being excluded from the set of choices offered to the user 458. This is because although $A_1$ was a perfectly good choice when only operation A was operational, it is not a good choice when both operation A and C are engaged, and $C_1$ has been selected. This could be because the rule for operation C was stronger than the rule for operation A, or that the selection of $C_1$ set a flag outlawing $A_1$, or the user, in the meantime had added new information to the system, via user provide metadata 540. For example, selecting a certain gable might be cause a certain set of shingle types to be offered, but the shingle selected may really be best with other gable types, making the original gable choice relatively unacceptable. Or, the original choice of gable might have been offered because it satisfies aesthetic and lighting rules, but may not be acceptable once the user indicates that rules computing drainage should also be taken into account.

In summary, the user can interactively select operations to participate in the problem solution, and for each operation, is offered a set of choices. Every time the user 1) makes a selection (thereby modifying the metadata about user selections 530), 2) adds knowledge to the system (via user provided metadata 540), or modifies 3) the data 421, 4) the algorithms 427 which compute metadata, 5) the rules (434 454), the rule weights, or the operations 451, the choices offered (438, 458) are also modified, reflecting the user's knowledge, intuitions, judgments and preferences.

EXAMPLES OF PREFERRED EMBODIMENTS

Two example implementations of the present invention are now described:
1) PRAVDA: Perceptual Rule-Based Architecture for Visualizing Data Accurately, is a rule-based visualization system. In PRAVDA, interactively-selected rules guide the user in constructing artifact-free representations of scientific and engineering data.
2) CRAFT: Color Rule and Font Tool, is a rule-based user interface customization system. In CRAFT, interactive rule-based guidance assists the user in creating legible and aesthetic user interfaces and applications.

Both systems are based on rule relating to human perception, cognition, color theory and aesthetics and are embodiments of the present invention described in detail above. This architecture puts rule-based guidance at the users' fingertips yet gives the user control over the invocation of the operations, and control over the rules which constrain these operations. This interactive rule-based system provides a unique development platform for interactively navigating through a complex decision space to identify those operations, and parameterizations of these operations, which provide the best solution, where that best solution explicitly incorporates user knowledge and judgement.

PRAVDA and CRAFT are the first interactive systems to provide operations constrained by perceptual rules. Systems which do not provide such guidance or intelligence, allow their users to select representation schemes which can mislead, confuse, or distract the user, and/or cause the user to misinterpret the presented information. These two example preferred embodiments provide an interactive rule based architecture and rules that relate to color, form, motion, and depth perception to intelligently guide the user selections. This invention also incorporates rules related to task demands and aesthetics.

Both systems incorporate perceptual rules related to the representation of information. In these examples, the information is represented by visual dimensions, such as color, form, grayscale,etc, but the rules can be based on other sensory dimensions, such as saltiness, loudness, roughness, perceived weight, etc. The perceptual effect of these dimensions is not easily predicted without a firm basis in the study of human perceptual systems. Since most computer users have easy access to computer systems which allow them to vary these perceptual dimensions, but no guidance is provided about their perceptual effects, the user can be lost in a maze of possibilities, leading to frustration. For example, a red object depicted behind a translucent green screen might be predicted to look "greenish red", a result which is perceptually impossible. According to rules of color mixture, this object will look "yellow". In PRAVDA, color mixture rules are available to the user, and are used, for example, by the rule-based object color operation. The operation for selecting the translucent object receives metadata about its color and translucence, as well as metadata about the choice made for the other object's color via user choice metadata 530. If the other object selected was "red", and the "redness" has a sufficiently high weight, the color "green" will not be offered to the user 458.

A novel attribute of this invention is the explicit incorporation of user goals into the system via user-provided metadata 540. This feature provides a novel tool for visualization, where the representation depends critically on the goal of the visualization. One goal might be to create an "isomorphic representation", where the perceived structure in the data is in 1:1 relationship with the actual structure the data (a desirable goal in diagnostic medical imaging). In this case, as the data value increases monotonically, the perceived magnitude or intensity of the perceptual dimension selected to represent that data variable should also increase monotonically. A class of visual dimensions described by S. S. Stevens (1951) which describe a power-law relationship between stimulus intensity and perceived intensity can be used, and include, for example, luminance, color saturation (e.g. "shades of redness"), roughness, loudness and saltiness. The perceptual scales are not limited to visual dimensions and the relationship between the data and the perceptual value need only be monotonic, and can thus be transformed if the application requires a strictly linear (e.g.) mapping. Using a scale other than the type described above to represent a continuous data variable can result in visual artifacts (misperceptions about the structure of the data), as in "seeing" a tumor which is not actually present in the data. The most common color scale in visualization systems, the Rainbow hue scale, is an example of a color scale which is not monotonic, but is commonly applied to represent continuous data, resulting in spurious segmentation artifacts.

A second type of goal is to create a representation where certain features of the display are highlighted, exaggerated, or segmented. Visual dimensions which can be used to achieve these goals are cited in the literature (e.g., Treisman, Rogowitz, et al, 1992), and include color, depth, movement, and loud noise. For example, to attract attention to the object of greatest magnitude, the color of that object should be different and brighter than the surrounding objects. Or, to segment a continuous variable into perceptually discrete regions, the application of this literature suggests that a small number of semantically namable colors be used, such as < blue, green, yellow, orange, red >.

In PRAVDA, the goal of the visualization is communicated to the system by user-provided metadata 540. This parameter is fed to the rule 545 which constrains the color selection or mapping operation accordingly, providing the novel goal-constrained visualization operations.

Another new class of rules map colors according to the spatial- frequency content of the data representation. Metadata 520 about data spatial frequency 1300 are computed via an algorithm 427 from the raw data 422. The color scale choices offered the user 451 depend on this value. Based on literature regarding the perception of spatial modulations (spatial resolution, image "grain", "bumpiness" 370 resolution), high spatial frequency information 1350 is carried by the luminance mechanism 1310 in human vision. Thus, to accurately represent high-resolution information, a luminance component is required.

The rule 610 takes as parameters <raw data, spatial frequency> 520 and sends parameters to the color map operation 620. The arguments of this operation include a representation of color information in terms of its three perceptual dimensions (hue, saturation, and luminance), and the parameters passed from the rule constrain the selection of color maps such that only selections with a luminance component are offered 458. Color maps which vary only in hue, and do not provide the luminance variation required to represent the high spatial frequency information are not offered. In PRAVDA, the color maps are paths through a perceptual 3-D metric color space, where the route taken through this space and the number of colors sampled from this path depend on the rule-based parameterization of the operation 620.

This role of the luminance mechanism 1310 and the inadequacy of the hue mechanism 1320 to carry high spatial-frequency information 1350 is shown in FIG. 13. Other rules important for representing information can also be drawn from this figure. Representing an object of one color on a background of another, as in text presentation, also depends on this relationship. CRAFT, for example, includes novel rules which link the color selections offered for text to the spatial frequency of that text. For example, if the text 1360 is small (small point size) or very fine (e.g., italic or Courier), it has high spatial frequency 1350, and thus, the text must differ significantly from its background in luminance. A rule based on this principle would take as parameters the spatial frequency of the text 520 and the color selected for the background 530, and offer the user choices which provide adequate luminance contrast for good legibility 458. If spatial frequency is high 1350 (e.g., small text or fine font) and the background is yellow, white text, for example, would not be offered. If spatial frequency is low 1330, however (e.g., a large text or bold font, especially text for large titles), white text might be offered, since for low spatial frequencies, the hue mechanism has even better spatial resolution than the luminance mechanism. (In most cases of text on display screens, however, the spatial frequency content is such that a significant luminance component is required for good legibility).

These are examples of rules in CRAFT which are derived from this psychophysical relationship between spatial resolution, color and luminance, and serve as examples of a class of rules too numerous to list in this disclosure. For example, at low spatial frequency 1330, the hue difference contributes to text legibility whereas at high spatial frequency it does not, and thus, color contrast can be used to enhance text legibility at low spatial frequency. The perceived saturation of an object ("colorfulness") is also enhanced for low spatial frequency objects, which means that a smaller hue difference is required to distinguish large objects than is required to distinguish small objects, a rule which can be used in workplace design (e.g., window background color selection) and in visualization (e.g., object color selection).

EXAMPLE 1

PRAVDA

FIG. 4 shows the rule-based architecture for PRAVDA. In a generic architecture for an interactive visualization system, data flow to operations producing results. The user selects which operations are to be applied to data, examines the results and may iteratively repeat the process. The selection of the operations and the choices associated with the operations is under the control of the user, which may be quite broad and flexible.

In the architecture of this invention, the inclusion of metadata 424, constrained set of choices 458 and novel feedback mechanisms 405 are added.

The metadata are higher-level descriptions of the data—information or data about data. These flow to the rules, which constrain the application of selected operation(s) based on this information and offer a range of appropriate choices associated with the operations.

A typical operation of metadata and rules in PRAVDA is the selection of a rule-based color map. Selecting appropriate colors for visualizing data depends on the characteristics of the data and other factors. For example, based on research in visual perception we claim that in order to accurately represent data with high spatial-frequency information content, a color map with a luminance component is required. In this case, then, the spatial frequency information is the metadata, and the rule is the relationship between spatial frequency content and appropriate color map selection. The metadata flow to the rule, which constrains the set of color maps the user can select, resulting in an appropriate representation of the data.

In this case, the rule is perceptual, related to the visual representation of the data. Any other type of rule may also be applied in the same way. Domain-specific rules, for example, specifying the cartographic projection appropriate for a particular type of map and task (e.g., efficient planning of ocean shipping routes vs. regulatory decisions on where polluters are located vs. analysis of weather data) can be embodied in this design. Likewise, the rules for generating queries to database systems can be applied interactively using this architecture.

FIG. 4 is a block diagram 400 showing the overall design of the present invention. This design is derived from the core of prior art interactive systems with the addition of the aforementioned rules, metadata, constrained operations (sets of choices) and novel feedback mechanisms. One embodiment of PRAVDA is built with a prior art interactive system for analysis and visualization of scientific and engineering data, the IBM Visualization Data Explorer (a trademark of the IBM Corporation). However, the invention described herein is not limited to Data Explorer-based implementations.

In PRAVDA, scientific or engineering data 420 is introduced to the system. The raw data 422 need to be described by metadata 424, which may be directly associated with the raw data or derived through specific computational algorithms 426. In the Data Explorer-based embodiment, the user has a wide selection of operation 430 that may be applied to said data, which includes PRAVDA operations. For non-PRAVDA operations, there is a wide range of choices (perhaps infinite) available for the invocation of said operation. For a user-selected PRAVDA operation 440, a rule or set or rules 454 is invoked, which constrain(s) the available choices to only those appropriate for the data and application 458. The user selects the desired choices 488 and the operation is applied to the data yielding an interim result 470. The user's selection is user to update the metadata 428 via novel feedback mechanisms 405. The user will evaluate the result 410 and may make another selection from the available choices 488, select a different operation/rule 486, change the metadata 475, get new data 420 or all of the above.

For example, the user may be studying measurements of ozone density in the earth's atmosphere from spacecraft-based instrumentation 420. The user may choose the operation 441 in which to color the data for a visualization of those data. The visualization could be a presentation illustrating ozone density over the entire earth for a specific day of the year. If the user chooses to use PRAVDA rule based operations by switching in the rule apparatus via the switch 452, the selection of choices offered for color maps 451 is constrained by the classes of metadata as outlined in FIG. 5 and the rules.

Four classes of metadata provided to the rules 500 are identified, shown as columns in the metadata structure 500. In PRAVDA they are data 510 necessary for a rule to be applied to the data 420, information computed via algorithms from the raw data or otherwise provided with the raw data 520, user-selected choices for specific operations 530 and user-provided information about the data and/or processes to take place 540. One type of data 420 which may be important for rules in PRAVDA are termed "ancillary", data associated with the actual numerical data values such as where data measurements may be taken or computed in some coordinate system. Such ancillary data would be relevant data metadata 510.

In PRAVDA, the ancillary data 510 is stored in the same fashion as the raw data (e.g., a component of a Data Explorer field object containing the raw data) while the other metadata 520 530 540 are attributes of a Data Explorer object (e.g., field). In the ozone example, ancillary data 510 might include whether valid measurements were available for specific geographic locations. To offer an appropriate set of choices for color presentation of the ozone data derived metadata 520 could include in one embodiment, the spatial frequency of the measurement values. If the ozone data are to be presented as a color display with the coastlines of the continents overlaid on top, the color of the coastlines is user selected choice metadata 530. Hence, if the coastlines are to be drawn in white lines, then white is eliminated from the choice of colors offered to the user for the display of the ozone data. If the goal of visualizing ozone is to highlight regions of relative depletion, where the density is low, that goal is user-provided metadata 540. Such metadata is used to constrain the selection of colors such that discrete sets of hues are offered to delineate regions of ozone depletion from non-depleted ones.

In one embodiment of PRAVDA, all data and metadata are stored within Data Explorer field objects. A Data Explorer field object, F, contains components which include the data themselves, where data are located in space and how those locations relate to each other. In the ozone example, F may also contain all four types of metadata 500, including a component of ancillary data, d1, identifying whether a measurement in F is valid at each available geographic location (relevant data 510); spatial frequency metadata, a1 (metadata computed from algorithms 520); the color of the coastline overlay, s1 (user choice metadata 530); and the goal of the visualization, u1 (user provided metadata 540). Thus, a Data Explorer field object, F, is represented by: F={data, metadata}={data, (d1, a1, s1, u1)}. On the first iteration (FIG. 6), the application of the rules yields a set of ozone color choices 458 to the user which do not include the color of the coastline overlay chosen independently by the user. Therefore, the offered colors are based upon the metadata 500. The user then chooses a set of colors 451 for the presentation of the ozone data with a coastline overlay. After examining that interim result 470, the user decides to consider an isomorphic presentation of the spatial distribution of ozone. Hence, metadata 540 is changed as u1 because of the novel feedback mechanism 405. A second (and any subsequent) iteration is shown in FIG. 7. Although the rules in the color mapping operation may be the same, the single change in the user provided metadata 540 results in a different set of choices: coloring schemes based upon changes in luminance that correspond to changes in ozone that do not include the color of the coastline overlay, white. Similarly, a change in the metadata about user selections 530 such that the coastline overlay is to be magenta instead of white, s1, cause a new set of choices of luminance-based color maps that include white. In this case the metadata constrains the choices offered to not include the color of the coastline overlay.

In other potential embodiments of PRAVDA, which may or may not be based upon IBM Visualization Data Explorer, constraint of choices is a generalized function, whether it be for operations themselves or choices associated with specific operation(s). From a large set of available operations 430 (or choices for an operation 451) only a relevant subset of operations 438 (or choices for an operation 458) are offered to the user, from which the user selects one or more operations. The set of choices is based upon the invocation of rules 434 utilizing metadata 428, which may be derived from data 420 via an algorithm 427. In all cases, the selections 461 become metadata for subsequent PRAVDA operations.

All rules in PRAVDA operate in the same way as the aforementioned coloring of ozone data. For example, if the selection of operation 441 is a realization strategy, then metadata computed by algorithm 520 indicate whether the data are two-dimensional or three-dimensional, and whether they are scalar or vector in nature. User-provided metadata 540 indicate to the rules whether a continuous or discrete presentation was appropriate. Based upon the combination of the metadata 520 540, a different set of realization choices 458 is offered to the user based on the operation of the rules. For example, the following table shows the choices of realization operations 630 from which the user can select that are identified by the rules 610 operating on the metadata 500 via the mechanism shown in FIG. 6. These choices are determined by the rules based upon the metadata d5 and u5.

| Relevant Data Metadata 520 | User Provided Metadata 530 (Realization Type) | |
| --- | --- | --- |
| (Data Type) | u5 = Continuous | u5 = Discrete |
| d5 = 2d scalar | color map, deformed surface | contours, points |
| d5 = 3d scalar | color map, opacity map | isosurfaces |
| d5 = 2d vector | streamlines | arrows |
| d5 = 3d vector | streamiines | arrows |

An examination of the interim results 470 could lead a change the metadata 428 or the data 420. For example, in a subsequent iteration as in FIG. 7, these changes could result in a different set of choices of operations to be offered to the user. For example, the introduction of a new operation 435 that computes the magnitude of a vector field, would change the relevant metadata 520. The same rule 710 is provided different metadata, which results in a different set of choices 730.

Another class of user provided metadata 540 could relate to how the the resulting visualization might be used. For example, if the visualization produced by PRAVDA were to be recorded on video as opposed to being viewed on the screen of a computer workstation 332, then that information constrains the choices of colors that are offered for selection (i.e., maximum saturation of 80%), the use of single pixel lines (i.e., no lines of less than 3-pixel width are to be available), etc. As with all operations in PRAVDA, the user has the final decision on using the selections offered.

Rules in PRAVDA may also be domain specific, and are thus, user provided 540. For example, if the data being visualized relate to information about the earth's surface, a rule-based operation for the cartographic projection of the presentation is available. Relevant data for specific rules 510 indicate the geographic extent of the data being visualized, which is sufficient to specify only those projection techniques that are appropriate. User-provided metadata 540 concerning the goal of the visualization further limit the number of relevant choices as it did with the selection of colors.

In the preferred embodiment of PRAVDA in Data Explorer, the user may not only choose which rules to invoke 454, but also examine and change the rule-based operations 486 based upon user evaluation of interim results 470. The Data Explorer embodiment provides a visual programming mechanism for specification of operations via graphical icons whose order of execution is indicated by connecting them with lines via a mouse 324 to compose a visual program. An icon representing a rule-based operation may be composed of another visual program, which may be opened and modified at user discretion for subsequent iterations. The visual program is interpreted interactively to invoke the specified operations. Further, the Data Explorer embodiment also includes a symbolic (scripting) language. PRAVDA operations may be specified symbolically in this language and interpreted as they are typed into a computer system via a key-board entry device 322. The PRAVDA operations may be examined via a standard text editor and modified at user discretion for subsequent iterations. Although this embodiment utilizes Data Explorer, PRAVDA operations could be implemented in terms of other extensible, prior art interactive systems with interpretative operation specification (e.g., symbolic language, visual programming).

FIG. 8 shows the mechanism for storing and modifying data and metadata. In the Data Explorer embodiment of PRAVDA, the data are stored 810 as an array of numbers 422 as a component of a Data Explorer field object. Any algorithm 426 used to derive metadata 424 accepts as input the data and/or metadata to generate the metadata 424, which is associated with the Data Explorer object containing the data as an attribute 810. Similarly, metadata related to user selections 530 are also stored as an attribute. For example, An algorithm 820 applied to the metadata is used to determine the range of choices to be offered to the user. The results of said algorithm are also stored as metadata 530. The user has the ability to modify the metadata or data at each iteration (after examining an interim result 470).

In the Data Explorer embodiment of PRAVDA, users select from a wide range of functions or those rule-based ones by a graphical user interface, in which the operations are identified via a pointing device such as a mouse 324; in visual programming, where the functions and their order of execution are selected graphically via screen icons and drawing connections between them; or symbolic language programming, where the operations are specified by typing of their symbolic names via a keyboard entry device 322. Although an embodiment of PRAVDA is utilizing the IBM Visualization Data Explorer, other embodiments could be established on different software platforms, which represent a number of disparate prior art interactive systems. In all cases, these rule-based operations receive data and metadata. The operations will query the received data for prerequisite metadata or derive the information via an algorithm, if it is not provided. Based upon the metadata, the rule is invoked to offer an appropriate set of choices.

EXAMPLE 2

CRAFT

A second example of a preferred embodiment of the present invention is called CRAFT (Color Rule and Font Tool). The purpose of CRAFT is to guide a user toward selecting a set of compatible colors and fonts for various areas of a computer display screen.

Figure 10:
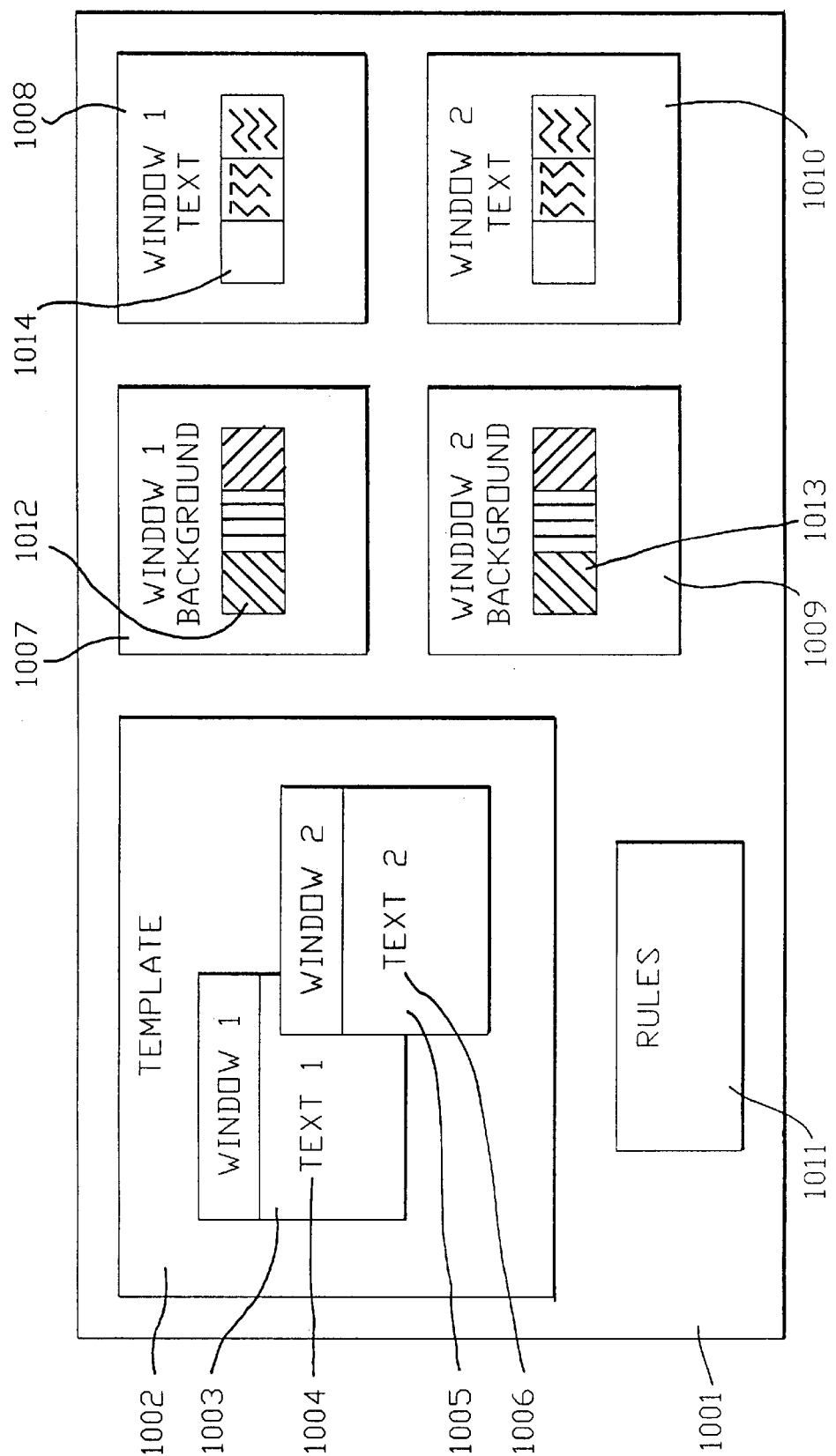
FIG. 10 is a drawing of a system output of second example preferred embodiment (Craft).

FIG. 10 shows a typical display screen 1001 the CRAFT system in operation.

Window 1002 in screen 1001 shows the interim result 470, which is actually a template of the proposed display screen.

There are four operations 441 selected. They are the selection of colors for each of the areas: "Window 1 Background" 1003, "Window 1 Text" 1004, "Window 2 Background" 1005, and "Window 2 Text" 1006. Windows 1007, 1008, 1009, and 1010 in screen 1001 show sets 458 of operation choices offered the user for colors in each of these areas. In a preferred embodiment, each set is ordered to show the desirability of each choice, with the best choice shown in the top left corner of its window. For example, the best choice for "Window 1 Background" 1003 is color 1012 shown in window 1007. The offered color choices may also be ordered in terms of their spatial locations in an arbitrary 3-dimensional metric color space.

Figure 11:
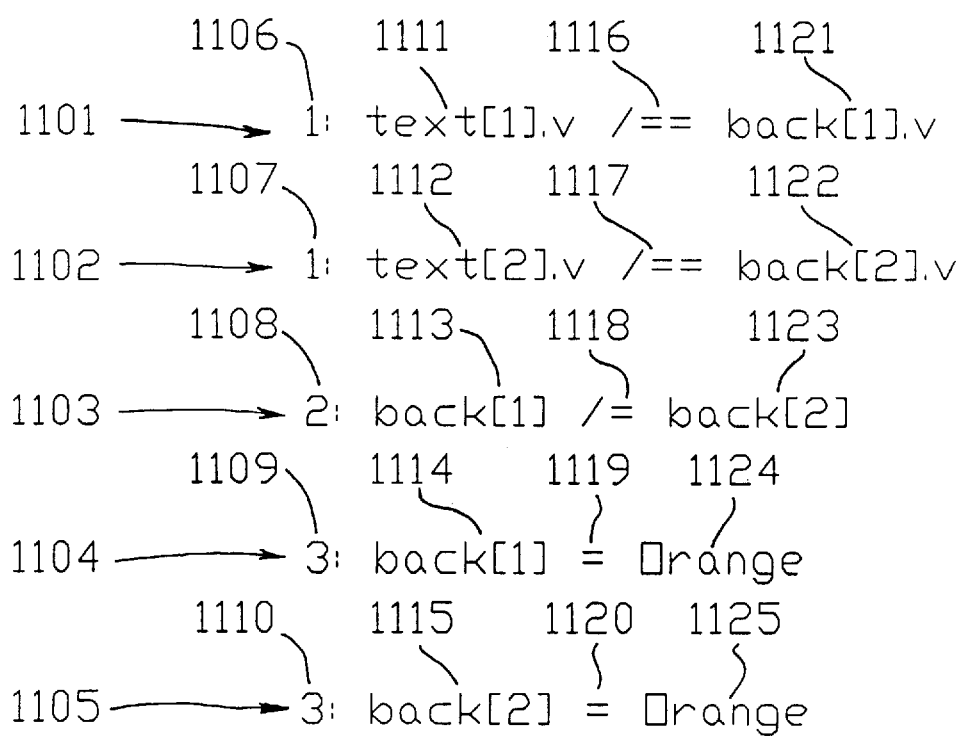
FIG. 11 is a drawing showing the structure of preferred rules for Craft and how the rules are applied.

Window 1011 in screen 1001 shows a set of rules 454 which govern the way the CRAFT system operates. FIG. 11 shows some examples such rules. Each rule 1101–1105 consists of four parts. Each has an importance number 1106–1110, followed by a component of data 1111–1115, followed by a relation 1116–1120, followed by another component of data 1121–1125.

Rules 1101–1102 form relations between one aspect of the colors of different areas, which correspond to operations 441. For example, luminance is one aspect of a color, and data component 1111 represents the luminance of the foreground color of "Window 1 Text" 1004, and data component 1121 represents the luminance of the color of "Window 1 Background" 1003.

Rule 1103 forms a relation between all aspects of the colors of different areas, which correspond to operations 441. For example, data component 1113 represents all aspects of the color of "Window 1 Background" 1003, and data component 1123 represents all aspects of the color of "Window 2 Background" 1005.

The importance 1106–1110 of a rule modifies its cumulative effect relative to that of the other rules. The importance of rules can be used to adjust control of system behavior when confronted with conflicting data, or simply to balance the rules for a desired effect. In a preferred embodiment, the actual weight of a rule is derived from its importance by raising the number 0.5 to the power of the importance. Thus, rule 1103 with importance 2 has half the weight of rule 1101 with importance 1, and rule 1104 with importance 3 has half the weight of rule 1103 with importance 2, and ¼ the weight of rule 1101 with importance 1.

The data components related by a rule may be relevant metadata 510, as for example a constant color Orange 1112.

The data components may also be metadata 428 computed by algorithm 520, as for example the luminance of colors 1111 and 1121, or the spatial frequency of a font. The data components may also be metadata about choices already selected by user 530, which the system provides through the feedback 405.

In CRAFT, all relations are inexact, as for example the approximately equal 1119, and the very much not equal 1116. Relations may be linear, as for example approximately the equal 1119, where equal differences between the data components have equal effects. Relations may be non-linear, as for example the very much not equal 1116, where effects of larger differences between the data components are accentuated over smaller ones.

Rule 1101 states that the luminance of the color of the "Window 1 Text" foreground 1004 is very much not equal to the luminance of the color of the "Window 1 Background" 1003. This assures high-contrast legibility of the text in window 1003. The perceptual rule 1101 has top priority 1106 to insure legibility over the stipulations of the lesser important rules 1103 and 1104, which also relate colors of "Window 1" 1003.

Rule 1102 assures high-contrast legibility of the text in window 1005 in the same way.

Rule 1103 states that the background color 1113 of the "Window 1 Background" 1003 is approximately not equal to the background color 1123 of the "Window 2 Background" 1005. This has the effect of distinguishing the windows. The rule 1103 has lesser priority 1108 than the priorities 1106 and 1107 for rules 1101 and 1102 because distinction of the windows is to be a less important consideration than insuring legibility in the windows.

Rule 1104 states that the background color 1114 of the "Window 1 Background" 1003 is approximately equal in all respects to the constant color Orange 1124. This has the effect of making the actual background colors of the windows near orange, e.g., orange, light orange, reddish-orange, etc. The rule 1104 has lesser priority 1109 than both rule 1101 with priority 1106 and rule 1103 with priority 1108, because the actual color of the windows is to be a less important consideration than both the legibility of text and the differentiation of the different window background colors.

In the same way, rule 1105 weakly insures that the background color 1115 of the "Window 2 Background" 1005 is approximately equal in all respects to the constant color Orange 1125. The rule 1105 has lesser priority 1110 than both rule 1102 with priority 1107 and rule 1103 with priority 1108, because the actual color of the windows is to be a less important consideration than both the legibility of text and the differentiation of the different window background colors.

During system operation, the user can adjust the appearance of the screen template interim result 1002 in several ways. A user can select 461 from an offered choice 458 in either of the windows 1007, 1008, 1009, or 1010. A user can also modify 486 the rules 454 in window 1111.

Figure 12:
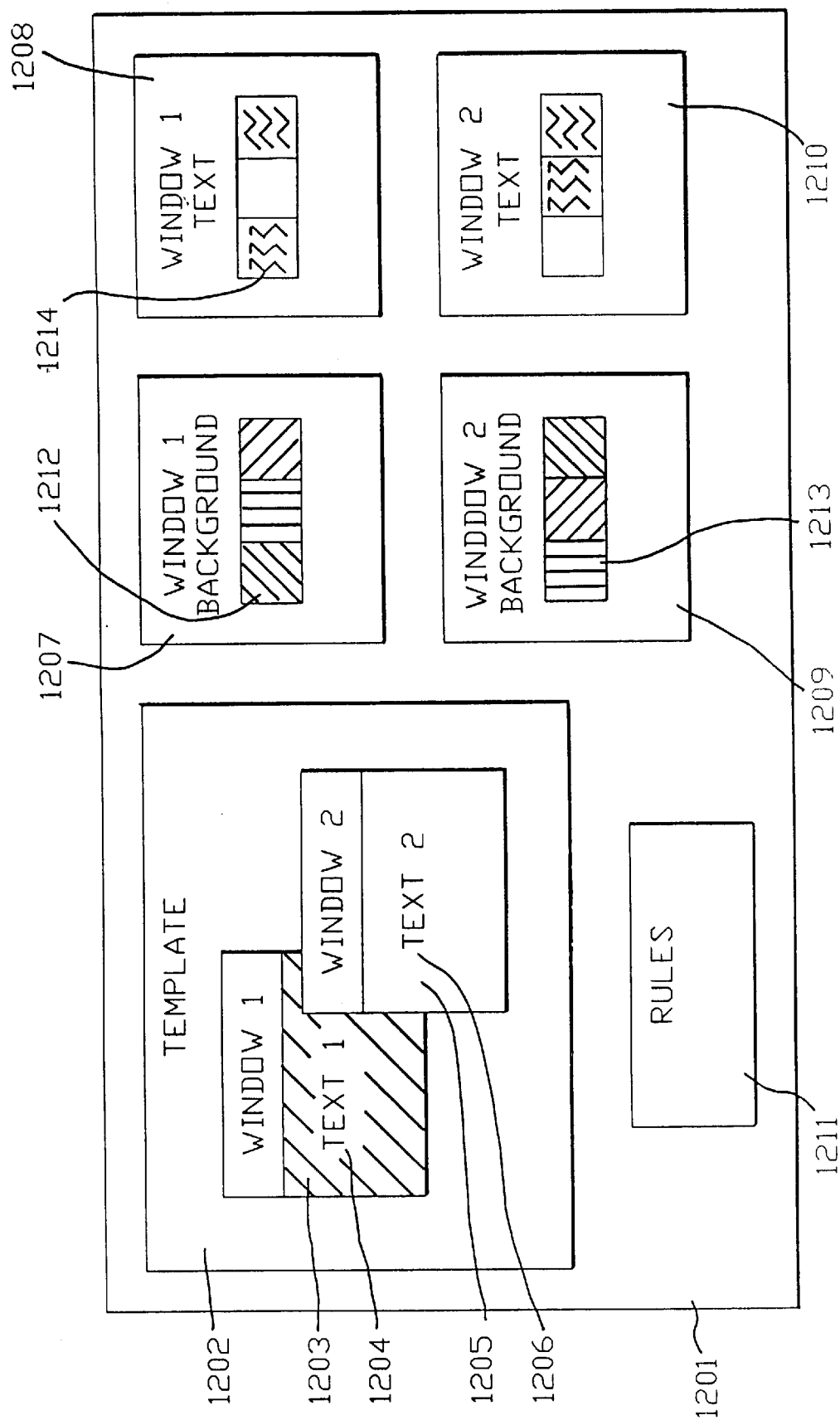
FIG. 12 is a drawing of a system output of Craft showing the effects of the applied rules.

FIG. 12 shows how CRAFT rules can operate with each other and with the interactions of the user. The entire current state of the system (that is user choices 461, other rules 454, metadata 428, and algorithms 427) affects how the rules operate. The cumulative effects of all the rules combine to produce the operation choices 458.

FIG. 12 shows the display screen 1201 after a user has selected the background color of "Window 1" 1203 though the selection window 1207. Selection window 1207 shows that a selection 1212 has been made for area 1203. Window 1202 shows the new interim result 470 with the updated color 1203. The color choices 1213 offered in selection window 1209 have changed from what they were 1013 in window 1009 because of the effects of the selection through the rules. The color choices 1214 offered in selection window 1208 have also changed from what they were 1014 in window 1008 because of the effects of that selection through the rules.

In addition to making color selections 461 in windows 1007–1010 in screen 1001, a user can change 486 the rules 454 that are displayed in window 1011 in screen 1001. By using a common text editor in window 1011, a user can modify, delete from, or add to the rules 454. When any part of the rule set 454 is changed, the entire rule set is re-evaluated by the CRAFT system so as to modify the way the system offers subsequent choices for all operations affected by the changed parameters.

For example, the importance 1108 of rule 1103 might be changed from 2 to 4. That would lower its importance below the importances 1109 and 1110 of rules 1104 and 1105, and there would be less tendency to distinguish the window background colors, and more tendency to make them both near orange. In such a case, window 1209 in screen 1201 would offer a new set of color choices 458, with more preferred near-orange choices.

In a preferred embodiment, the system operates by interpreting each rule in the rule set, according to the rule syntax shown in FIG. 11. There are a number of different aspects of colors and fonts supported through the metadata 428, such as for example color luminance, color intensity, color hue, color chroma value, font height, font width, and font spatial frequency. The system maintains a score in an array of scores for each possible choice 458, and for each possible operation 441. Each rule is interpreted, by facilities such as Lex and Yacc (available as standard utilities on UNIX and other operating systems—UNIX is a registered trademark of AT&T). During interpretation of each rule, the system accumulates the score for each possible choice in each operation used in the rule, as modified by the weight of the rule, which is derived from the importance of the rule. Then, each set of choices 451 is sorted in decreasing order of its total score, and the best preferred choices—those with scores above a certain threshold—are then offered to the user 458.

This description has focused on data, metadata, and rules related to color selection. CRAFT also supports data, metadata, and rules related to font selection. It incorporates a novel feature, whereby font and color selections are linked by rules. These rules incorporate known relationships between spatial frequency and luminance to insure that, independent of the hues of the colors selected, the luminance contrast of each object against its background will be sufficient for good detectability and legibility. This involves an inverse relationship between the amount of luminance contrast required and the spatial frequency of the object, for the high spatial-frequency 1350 text commonly found in computer display and print applications.

It will be appreciated that one skilled in the art that is given this disclosure could come up with alternative embodiments that are within the contemplation of the inventors. For example, the present invention 400 could be an interactive rule based system that receives its data 420 from a prior art expert system 100, interactive system 200, or another interactive rule based system 400. In addition, the interim result 470 of the present invention 400 could be provided to a prior art expert system 100, interactive system 200, or another interactive system 400. This idea could be continued until a system is created with multiple levels of these systems. Furthermore, parts of the present invention can be replaced with expert 100 or interactive systems 200. For example, a typical selected operation 441 has a associated choice set 451 and an offered choice set 458 that the user selects from 461. These functions could be replaced for one or more operations with an interactive system 200 or an expert system 100. Alternative the data 420, operation set 430, offered operations 438 and user selection of operations 435 can be replaced with an expert 100 or interactive system 200.

We claim:

1. An interactive rule based computer system comprising:
   means for storing data;
   an operation set of one or more operations, each operation having a choice set of one or more operation choices associated with the respective operation;
   one or more rule sets, each rule set associated with one of the choice sets, and one or more of the rule sets having one or more rules that constrain the choice set to produce an offered choice set, the offered choice set having a subset of the operation choices of the choice set, the offered choice set presented to a user on an output of the computer system; and
   a feed back mechanism monitoring selection information about one or more selections of operations and one or more selections of operation choices iteratively selected by the user, the selections of operation choices changing an interim result, the feed back mechanism feeding back the selection information to the rule sets, one or more rules in one or more respective rule sets parameterized by the selection information to replace the offered choice set with a new offered choice set that is constrained by the rule set parameterized by the selection information.

2. A system, as in claim 1, where the user can select which of one or more of the respective rule sets constrains the offered choice set.

3. A system, as in claim 1, where the selection information feeds back to one or more rule specific metadata means, each rule specific metadata means associated with a rule set that has one or more rules that access the selection information from the rule specific metadata means associated with the respective rule set.

4. A system, as in claims 3, where the user can change information in the metadata means that is accessed by its associated rule set.

5. A system, as in claim 3, where a metadata algorithm provides metadata to the metadata means.

6. A system, as in claim 5, where the user can change the metadata algorithm.

7. A system, as in claim 1, where the user can change one or more rules in one or more of the rule sets.

8. A system, as in claim 1, where the user selects rule weights to reflect the importance of one or more rules in one or more of the rule sets.

9. A system, as in claim 8, where the rule weights are used to resolve conflicts among the rules.

10. A system, as in claim 1, where the interim results are incomplete.

11. A system, as in claim 1, where the rules of one or more of the respective rule sets partially constrain the offered choice set so that the offered choice set has two or more operation choices.

12. A system, as in claim 1, where one or more operations, the choice set associated with the operation, and the rules constraining the choice set are an expert system.

13. An interactive rule based computer system comprising:
   means for storing data;
   an operation set of one or more operations, each operation having a choice set of one or more operation choices associated with the operation;
   one or more rule sets, each rule set associated with a choice set and one or more rule sets having one or more rules that constrain its associated choice set to produce an offered choice set, the offered choice set having a subset of the operation choices of the choice set, the offered choice set presented to a user on an output of the computer system;
   one or more operation rule sets, each operation set associated with and constraining the operation set to produce an offered operation set, the offered operation set having a subset of the operations, the offered operation set presented to a user on an output of the computer system; and
   a feed back mechanism monitoring selection information about one or more selections of operations and operation choices iteratively selected by the user, the selections of operation choices changing an interim result, the feed back mechanism feeding back the selection information about the user selections to the rule sets, one or more rules in one or more rule sets using the selection information to constrain its associated choice set so that one or more of the constrained associated choice sets has some subset of its operation choices offered to the user in an offered set and the constrained operation set has some subset of its operations offered to the user in offered operation set on the output.

14. A system, as in claim 13, where the constraint on the operation set is switchable by the user.

15. A method of a user interacting with a rule based computer system comprising the steps of:
   viewing a system output means that presents the user with an offered operation set having one or more operations or one or more offered choice sets, each offered choice set being a subset of a choice set and each choice set having one or more operation choices associated with an operation; and
   iteratively selecting, by a user, one or more operations from the offered operation set and selecting one or more choices from one or more of the offered choice sets;
   whereby the selected operations and operation choices are applied to data to produce an interim result.

16. A method, as in claim 15, further comprising the step of:
   feeding back information about the selections to one or more rule sets, each rule set being associated with a choice set and one or more rules in one or more rule sets constraining its associated choice set using the selection information to produce the subset that is the offered choice set presented on the output means.

17. An interactive rule based computer system comprising:
   means for storing data;
   an operation set of one or more operations, each operation having a choice set of one or more operation choices associated with the operation;
   one or more rule sets, each rule set associated with a choice set and one or more rule sets having one or more rules pertaining to human perception that constrain its associated choice set to produce an offered choice set, the offered choice set having a subset of the operation choices of the choice set, the offered choice set presented to a user on an output of the computer system; and a feed back mechanism monitoring selection information about one or more selections of operations and operation choices iteratively selected by the user, the selections of operation choices changing an interim result, the feed back mechanism feeding back the selection information to the rule sets, one or more rules in one or more rule sets using the selection information to constrain its associated choice set so that one or more of the constrained associated choice sets has some subset of its operation choices offered to the user in an offered set on the output as a perceptually meaningful representation.

18. A system, as in claim 17, where the representation is one or more images with high spatial frequency and one or more of the rules constrain one or more color maps being the choice sets, the color maps constrained depending on the spatial frequency of the image so that the luminance at each point of the image varies monotonically with a data value at each respective point of the image.

19. A system, as in claim 17, where the representation is of a text and a background of the text and a luminance difference between the text and the background of the text increases as a typeface of a font of the text becomes finer.

20. A system, as in claim 17, where the representation is a text and a background of the text and a luminance difference between the text and the background of the text increases as a typeface of a font of the text becomes smaller in size.

21. A system, as in claim 17, where the representation is one or more images with low spatial frequency and one or more of the rules constrain one or more color maps being the choice sets, the color maps constrained depending on the spatial frequency of the image so that the saturation at each point of the image varies monotonically with a data value at each respective point of the image.

22. A system, as in claim 17, where the representation contains text and one or more of the rules constrain a text color of the text and a background color of a background of the text so that adequate luminance contrast is provided for legibility of the text.

23. An interactive rule based computer system comprising:

means for storing data;

an operation set of one or more operations;

one or more rule sets, each rule set associated with one of the operations, and one or more of the rule sets having one or more rules that constrain the operation to produce one or more offered operations, the offered operations being a subset of the operations, the offered operations presented to a user on an output of the computer system; and a feed back mechanism monitoring selection information about one or more selections of operations iteratively selected by the user, the selections of operation changing an interim result, the feed back mechanism feeding back the selection information to the rule sets, one or more rules in one or more respective rule sets parameterized by the selection information to replace the offered operation set with a new offered operation set that is constrained by the rule set parameterized by the selection information.

* * * * *